USO12179881B2

(12) United States Patent
Tetsuka et al.

(10) Patent No.: US 12,179,881 B2
(45) Date of Patent: Dec. 31, 2024

(54) OPERATING SYSTEM FOR HUMAN-POWERED VEHICLE

(71) Applicant: SHIMANO INC., Sakai (JP)

(72) Inventors: Toshio Tetsuka, Sakai (JP); Taihei Nishihara, Sakai (JP); Eiji Mishima, Sakai (JP); Takuma Sakai, Sakai (JP); Takafumi Nishino, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/714,974

(22) Filed: Apr. 6, 2022

(65) Prior Publication Data
US 2022/0227458 A1    Jul. 21, 2022

Related U.S. Application Data

(63) Continuation of application No. 16/525,506, filed on Jul. 29, 2019, now Pat. No. 11,554,834.

(51) Int. Cl.
*B62M 25/08* (2006.01)
*B62K 23/02* (2006.01)
(Continued)

(52) U.S. Cl.
CPC ............ *B62M 25/08* (2013.01); *B62K 23/02* (2013.01); *B62M 9/12* (2013.01); *B60L 2200/12* (2013.01);
(Continued)

(58) Field of Classification Search
CPC .. B62M 25/08; B62M 9/12; B62M 2025/003; B62M 2025/006; B62K 23/02; B62K 21/12; B60L 2200/12
See application file for complete search history.

(56) References Cited

U.S. PATENT DOCUMENTS

| 6,453,262 | B1 * | 9/2002 | Kitamura | ............... | B62M 25/00 |
| | | | | | 474/70 |
| 6,941,834 | B2 * | 9/2005 | Irie | ........................ | B62K 21/12 |
| | | | | | 74/489 |

(Continued)

FOREIGN PATENT DOCUMENTS

| CN | 106976521 | 7/2017 |
| CN | 107434003 | 12/2017 |

(Continued)

OTHER PUBLICATIONS

Office Action issued by the United States Patent and Trademark Office for the parent U.S. Appl. No. 16/525,506, May 6, 2022.
(Continued)

*Primary Examiner* — Thomas C Diaz
(74) *Attorney, Agent, or Firm* — MORI & WARD, LLP

(57) ABSTRACT

An operating system comprises a first operating device, a second operating device, a first user interface, a second user interface, and a controller. The first user interface is configured to receive a first user input. The second user interface is configured to receive a second user input. At least one of the first user interface and the second user interface is configured to be operated to control at least one electric component. The controller is configured to control the at least one electric component based on at least one of the first user input and the second user input. The at least one electric component includes at least one of a gear changing unit, a gear changing unit, an adjustable seatpost, an internal gear hub, a front suspension, a rear suspension, a cycle computer, a smartphone, a tablet computer, and a light emitting device.

19 Claims, 14 Drawing Sheets

(51) Int. Cl.
*B62M 9/12* (2006.01)
*B62J 45/10* (2020.01)
*B62J 45/20* (2020.01)
*B62K 19/36* (2006.01)
*B62K 21/12* (2006.01)
*B62M 6/50* (2010.01)
*B62M 6/90* (2010.01)
*B62M 25/00* (2006.01)

(52) U.S. Cl.
CPC ............ *B62J 45/10* (2020.02); *B62J 45/20* (2020.02); *B62K 19/36* (2013.01); *B62K 21/12* (2013.01); *B62M 6/50* (2013.01); *B62M 6/90* (2013.01); *B62M 2025/003* (2013.01); *B62M 2025/006* (2013.01)

(56) References Cited

U.S. PATENT DOCUMENTS

| | | | | |
|---|---|---|---|---|
| 6,991,081 B2* | 1/2006 | Uno | ............... | B62K 23/06 |
| | | | | 192/217 |
| 7,165,641 B2* | 1/2007 | Kitamura | ............... | B60L 50/20 |
| | | | | 180/220 |
| 7,503,420 B2* | 3/2009 | Fujii | ............... | B62K 23/02 |
| | | | | 74/502.2 |
| 7,760,078 B2* | 7/2010 | Miki | ............... | B62K 23/02 |
| | | | | 340/432 |
| 7,779,724 B2* | 8/2010 | Fujii | ............... | B62M 25/08 |
| | | | | 340/432 |
| 8,035,046 B2 | 10/2011 | Perini | | |
| 8,655,561 B2* | 2/2014 | Kitamura | ............... | B62K 23/06 |
| | | | | 701/51 |
| 9,211,936 B2* | 12/2015 | Gao | ............... | B62M 25/08 |
| 9,491,788 B1 | 11/2016 | Kasai et al. | | |
| 9,682,743 B2* | 6/2017 | Miyoshi | ............... | B62J 50/22 |
| 11,027,709 B2* | 6/2021 | Komatsu | ............... | B60T 7/085 |
| 11,554,834 B2* | 1/2023 | Tetsuka | ............... | B62M 9/122 |
| 11,590,940 B2* | 2/2023 | Stubberud | ............... | B62K 23/06 |
| 2008/0180233 A1* | 7/2008 | Miglioranza | ............... | B62K 23/02 |
| | | | | 340/432 |
| 2014/0165763 A1 | 6/2014 | Harris | | |
| 2016/0347411 A1 | 12/2016 | Yamamoto et al. | | |
| 2017/0203814 A1* | 7/2017 | Kurokawa | ............... | B62K 23/00 |
| 2018/0057103 A1* | 3/2018 | Komatsu | ............... | F15B 7/08 |
| 2018/0057104 A1* | 3/2018 | Komatsu | ............... | B62M 25/08 |
| 2018/0148127 A1* | 5/2018 | Sato | ............... | B62L 3/02 |
| 2020/0010150 A1* | 1/2020 | Tasoniero | ............... | B62K 21/26 |

FOREIGN PATENT DOCUMENTS

| | | |
|---|---|---|
| CN | 207773360 U | 8/2018 |
| DE | 10 2014 004 996 | 10/2015 |
| DE | 10 2017 127 381 | 5/2018 |
| JP | 2018-89989 | 6/2018 |
| TW | 201700335 | 1/2017 |

OTHER PUBLICATIONS

Office Action with Form PTO-892 Notice of References Cited issued by the U.S. Patent and Trademark Office for the U.S. Appl. No. 16/525,506, filed Oct. 1, 2021.

* cited by examiner

OPERATING SYSTEM FOR HUMAN-POWERED VEHICLE

CROSS-REFERENCE TO RELATED APPLICATIONS

The present application is a continuation application of the U.S. patent application Ser. No. 16/525,506 filed Jul. 29, 2019. The contents of this application are incorporated herein by reference in their entirety.

BACKGROUND OF THE INVENTION

Field of the Invention

The present invention relates to an operating system for a human-powered vehicle.

Discussion of the Background

A human-powered vehicle includes an operating unit configured to operate an electric component.

SUMMARY OF THE INVENTION

In accordance with an aspect of the present invention, an operating system for a human-powered vehicle comprises a first operating device, a second operating device, a first user interface, a second user interface, and a controller. The first operating device comprises a first base member and a first operating member. The first base member includes a first coupling end configured to be coupled to a handlebar, a first free end opposite to the first coupling end, and a first grip portion provided between the first coupling end and the first free end. The first operating member is pivotally coupled to the first base member about a first pivot axis. The second operating device comprises a second base member and a second operating member. The second base member includes a second coupling end configured to be coupled to the handlebar, a second free end opposite to the second coupling end, and a second grip portion provided between the second coupling end and the second free end. The second base member is a separate member from the first base member. The second operating member is pivotally coupled to the second base member about a second pivot axis. The first user interface is configured to receive a first user input and mounted to the first operating device. The second user interface is configured to receive a second user input and mounted to the second operating device. At least one of the first user interface and the second user interface is configured to be operated to control at least one electric component. The controller is configured to control the at least one electric component based on at least one of the first user input and the second user input. The at least one electric component includes at least one of a gear changing unit, a gear changing unit, an adjustable seatpost, an internal gear hub, a front suspension, a rear suspension, a cycle computer, a smartphone, a tablet computer, and a light emitting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
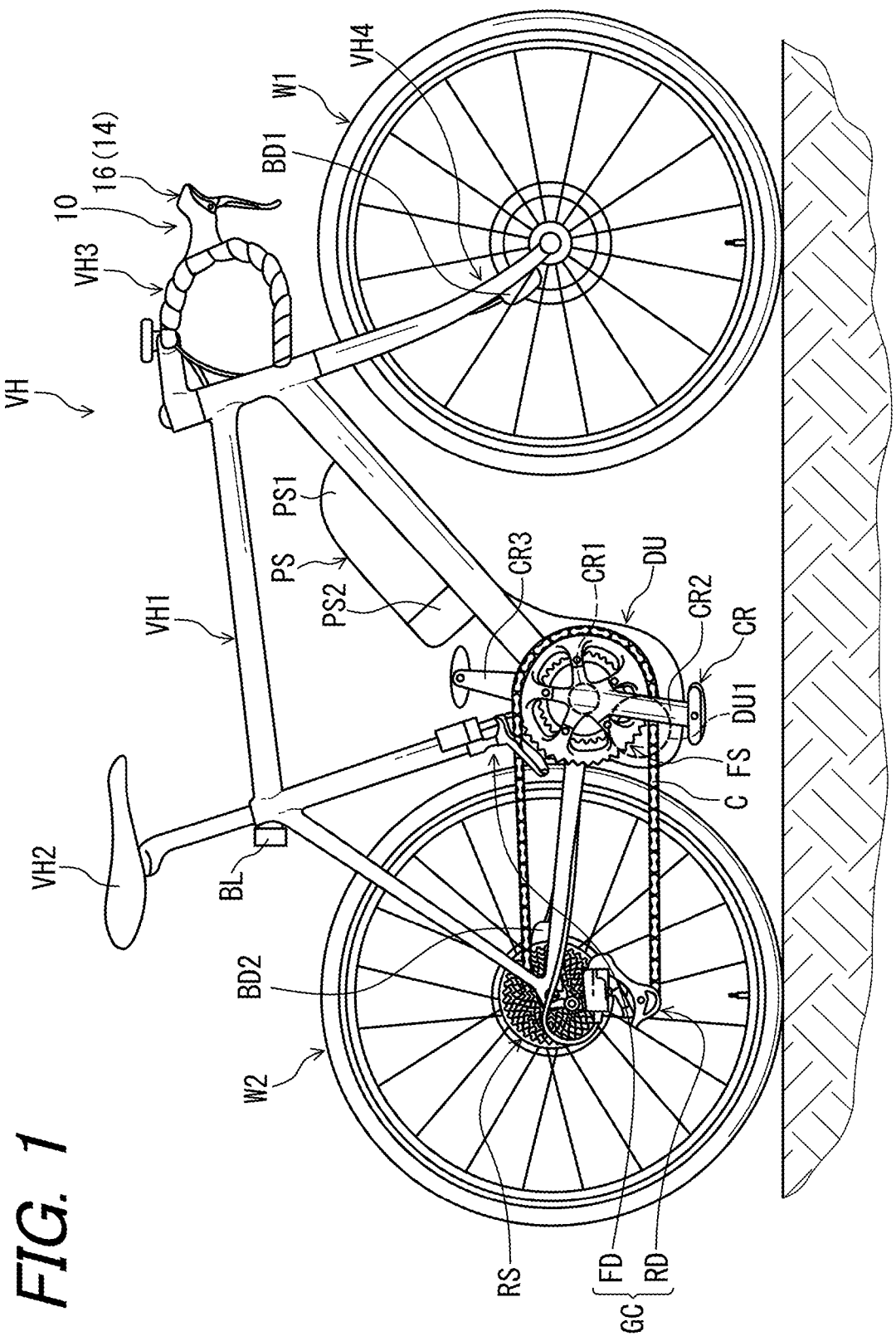
FIG. 1 is a side elevational view of a human-powered vehicle including an operating system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to time trial bikes or any type of human-powered vehicles.

The human-powered vehicle VH further includes a vehicle body VH1, a saddle VH2, a handlebar VH3, a front fork VH4, a drive train VH5, a first brake device BD1, a second brake device BD2, a first wheel W1, and a second wheel W2. The front fork V114 is rotatably mounted to the vehicle body VH1. The handlebar VH3 is secured to the front fork VH4. The first wheel W1 is rotatably coupled to the front fork VH4. The second wheel W2 is rotatably coupled to the vehicle body VH1. The first brake device BD1 is configured to apply a braking force to the first wheel W1. The second brake device BD2 is configured to apply a braking force to the second wheel W2.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the operating system 10 or other components, should be interpreted relative to the human-powered vehicle VH equipped with the operating system 10 as used in an upright riding position on a horizontal surface.

The drive train VH5 includes a crank assembly CR, a front sprocket assembly FS, a rear sprocket assembly RS, a chain C, and a gear changing device GC. The front sprocket assembly FS is secured to the crank assembly CR and includes a plurality of front sprockets. The rear sprocket assembly RS is rotatably mounted to the vehicle body VH1 and includes a plurality of rear sprockets. The chain C is engaged with the front sprocket assembly FS and the rear sprocket assembly RS. The gear changing device GC includes a gear changing unit FD and a gear changing unit RD. The gear changing unit FD is mounted to the vehicle body VH1 and is configured to shift the chain C relative to the front sprocket assembly FS to change a gear position of the gear changing unit FD. The gear changing unit RD is mounted to the vehicle body VH1 and is configured to shift the chain C relative to the rear sprocket assembly RS to change a gear position of the gear changing unit RD. The gear changing device GC has a gear ratio. The gear ratio is a ratio of a rotational speed of the rear sprocket assembly RS to a rotational speed of the front sprocket assembly FS. In this embodiment, the gear changing unit FD includes a derailleur. The gear changing unit RD includes a derailleur. However, each of the gear changing unit FD and the gear changing unit RD can include another device such as an internal gear hub. At least one of the gear changing units FD and RD can be omitted from the drive train VH5.

The human-powered vehicle VH includes an assist driving unit DU configured to assist a human power. The assist driving unit DU includes an assist motor DU1 configured to impart propulsion to the human-powered vehicle VH. The crank assembly CR includes a crank axle CR1 and crank arms CR2 and CR3. The crank arms CR2 and CR3 are secured to the crank axle CR1. For example, the assist driving unit DU is configured to apply an assist driving force to the crank assembly CR.

Figure 2:
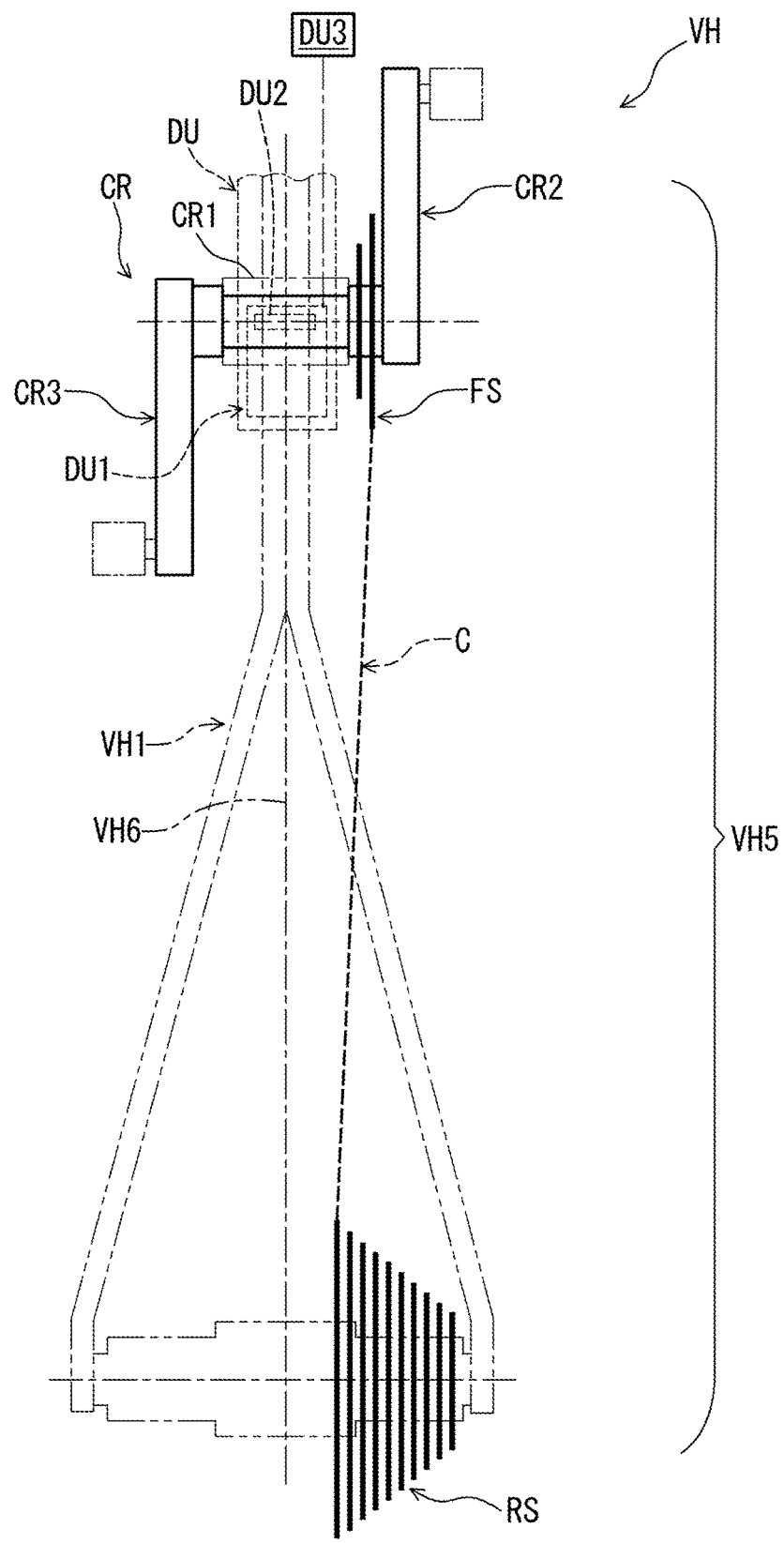
FIG. 2 is a schematic diagram of a drive train of the human-powered vehicle illustrated in FIG. 1.

As seen in FIG. 2, the assist driving unit DU comprises a pedaling-force sensor DU2 configured to sense a pedaling force applied to the crank assembly CR from a rider. The assist driving unit DU includes a motor controller DU3 configured to control the assist motor DU1 to add the assist driving force to the drive train VH5 based on an assist ratio and the pedaling force sensed by the pedaling-force sensor DU2. The motor controller DU3 is configured to select and/or calculate the assist ratio. However, the motor controller DU3 can be configured to control the assist motor DU1 to add the assist driving force to the drive train VH5 regardless of the assist ratio and/or the pedaling force. For example, the motor controller DU3 is configured to control the assist motor DU1 to add the assist driving force to the crank assembly CR based on a user input received by the operating system 10.

As seen in FIG. 1, the human-powered vehicle VH includes a power supply PS and a brake lamp BL. The power supply PS is electrically connected to the assist driving unit DU, the gear changing device GC, and the brake lamp BL to supply electricity to the assist driving unit DU, the gear changing device GC, and the brake lamp BL. The power supply PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the assist driving unit DU, the gear changing device GC, and the brake lamp BL. For example, the battery PS1 a replaceable and/or rechargeable battery. The battery holder PS2 is electrically connected to the assist driving unit DU, the gear changing device GC, and the brake lamp BL to supply electricity from the battery PS1 to the assist driving unit DU, the gear changing device GC, and the brake lamp BL. In this embodiment, the power supply PS is mounted to the vehicle body VH1. However, the location of the power supply PS is not limited to this embodiment. The battery holder PS2 can be provided in the vehicle body VHL. The human-powered vehicle VH can include another power supply configured to supply electricity to the assist driving unit DU, the gear changing device GC, and the brake lamp BL instead of or in addition to the power supply PS.

Figure 3:
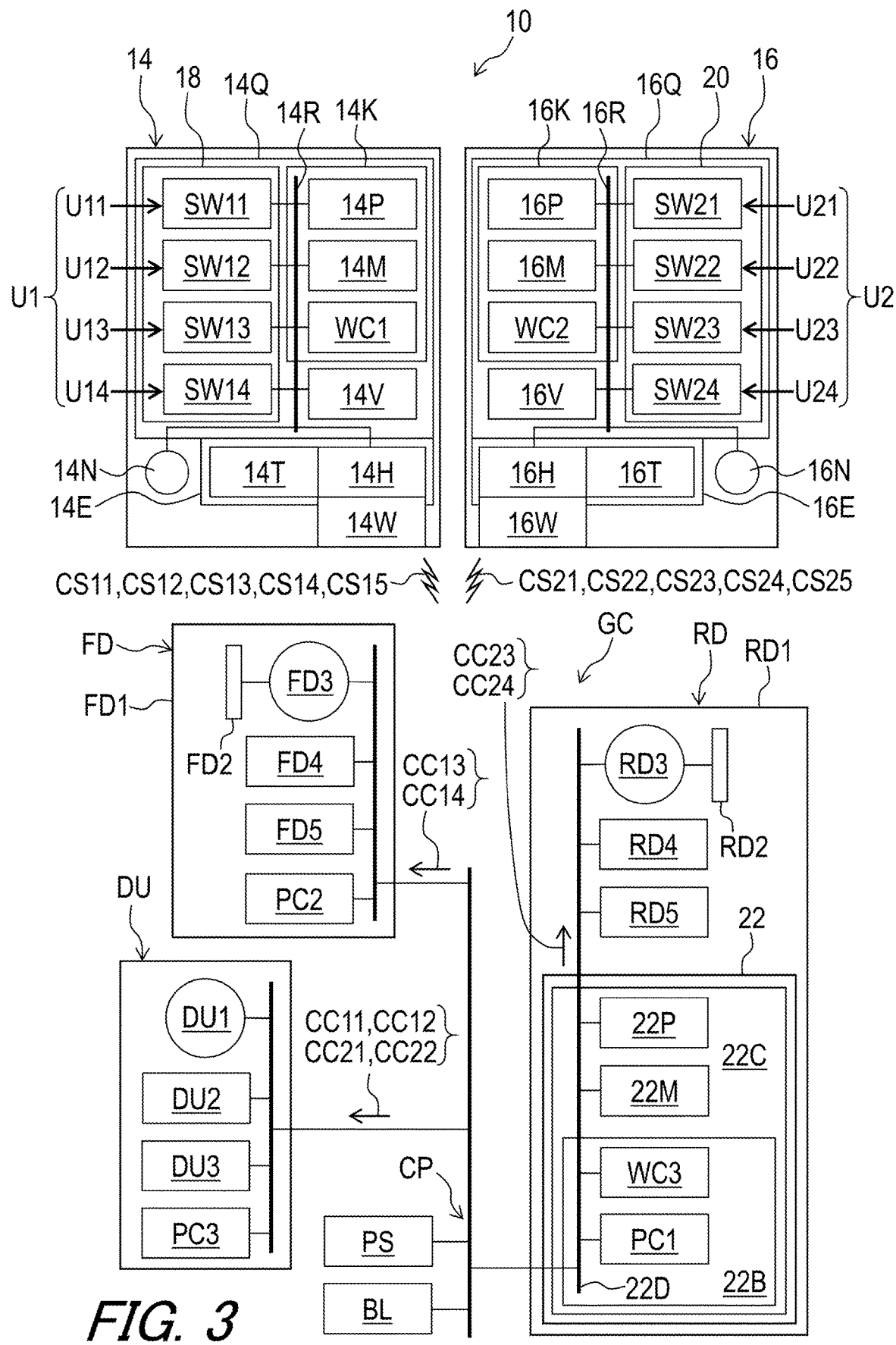
FIG. 3 is a schematic block diagram of the human-powered vehicle illustrated in FIG. 1.

As seen in FIG. 3, the human-powered vehicle VH includes an electric communication path CP. The power supply PS is electrically connected to the assist driving unit DU, the gear changing device GC, and the brake lamp BL with the electric communication path CP to supply electricity to the assist driving unit DU, the gear changing device GC, and the brake lamp BL through the electric communication path CP. For example, the electric communication path CP includes at least one electric cable and/or at least one junction.

Figure 4:
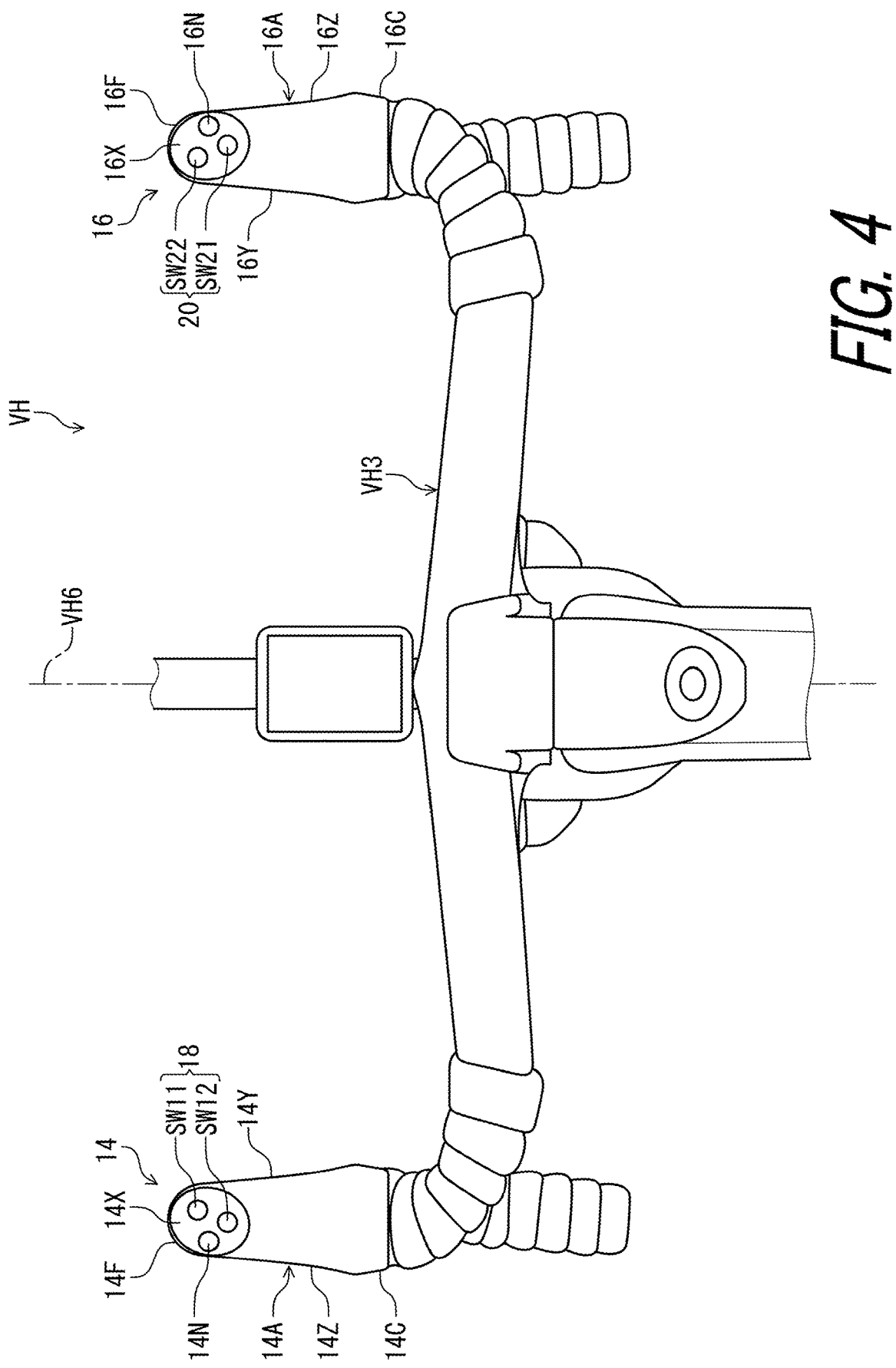
FIG. 4 is a plan view of the operating system and a handlebar of the human-powered vehicle illustrated in FIG. 1.

As seen in FIG. 4, the operating system 10 for the human-powered vehicle VH comprises a first operating device 14 and a second operating device 16. The first operating device 14 and the second operating device 16 are mounted to the handlebar VH3. The first operating device 14 is provided on a left side with respect to a center plane VH6 of the human-powered vehicle VH. The second operating device 16 is provided on a right side with respect to the center plane VH6 of the human-powered vehicle VH. However, the first operating device 14 can be provided on the right side with respect to the center plane VH6 of the human-powered vehicle VH. The second operating device 16 can be provided on the left side with respect to the center plane VH6 of the human-powered vehicle VH.

Figure 5:
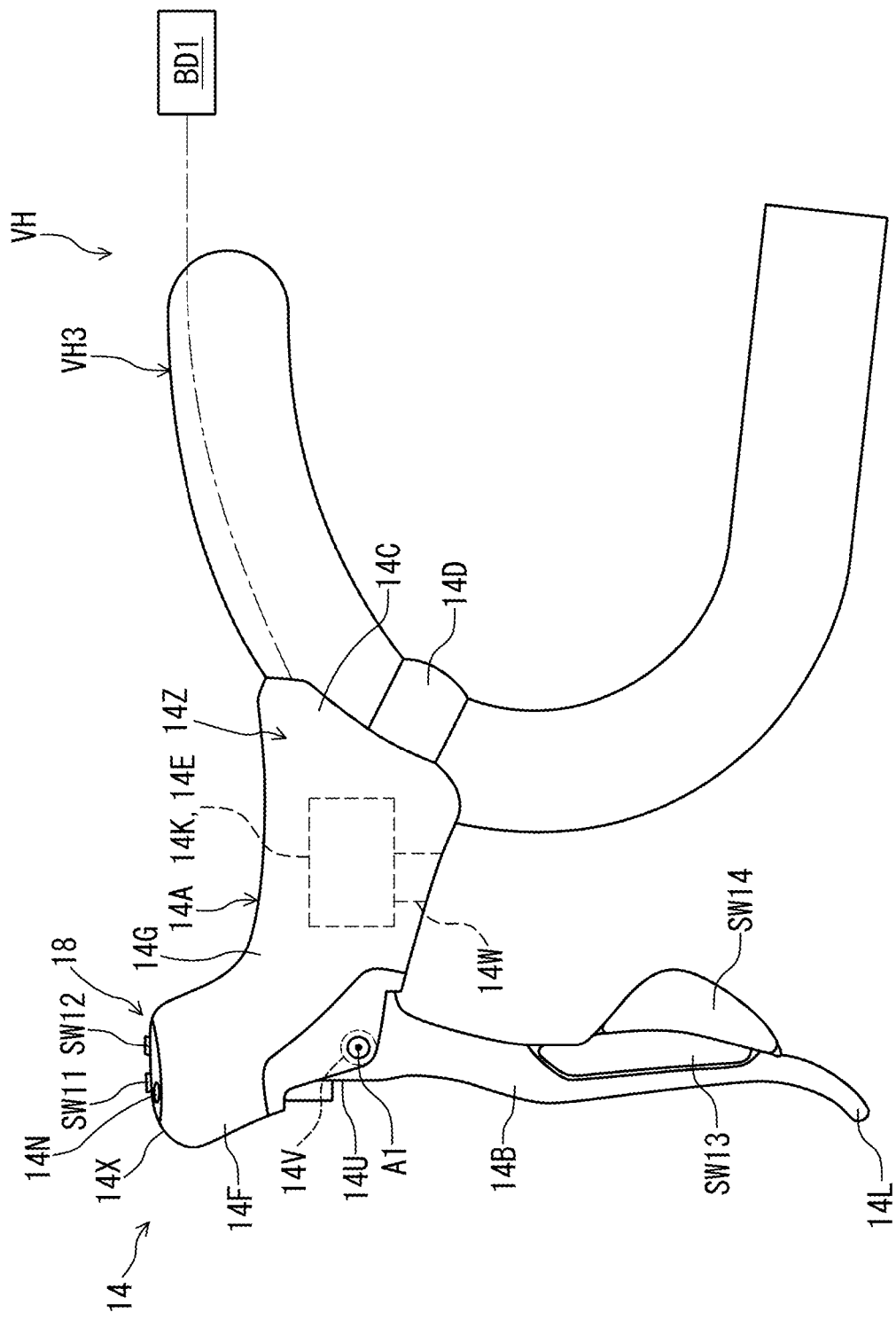
FIG. 5 is a side elevational view a first operating device of the operating system of the human-powered vehicle illustrated in FIG. 1.

As seen in FIG. 5, the first operating device 14 is configured to operate the first brake device BD1. The first operating device 14 comprises a first base member 14A and a first operating member 14B. The first base member 14A includes a first coupling end 14C and a first free end 14F. The first coupling end 14C is configured to be coupled to the handlebar VH3. The first free end 14F is opposite to the first coupling end 14C. The first operating member 14B is pivotally coupled to the first base member 14A about a first pivot axis A1. In this embodiment, the first operating device 14 comprises a first clamp 14D configured to couple the first coupling end 14C to the handlebar VH3. The first base member 14A includes a first grip portion 14G. The first grip portion 14G is provided between the first coupling end 14C and the first free end 14F. The first grip portion 14G is configured to be gripped by a user. However, the first grip portion 14G can be omitted from the first base member 14A.

In this embodiment, the first operating member 14B includes a first lower end 14L and a first upper end 14U that is closer to the first base member 14A than the first lower end 14L. The first lower end 14L is positioned below the first upper end 14U while the first operating device 14 is mounted to the handlebar VH3. However, the structure of the first operating member 14B is not limited to this embodiment.

Figure 6:
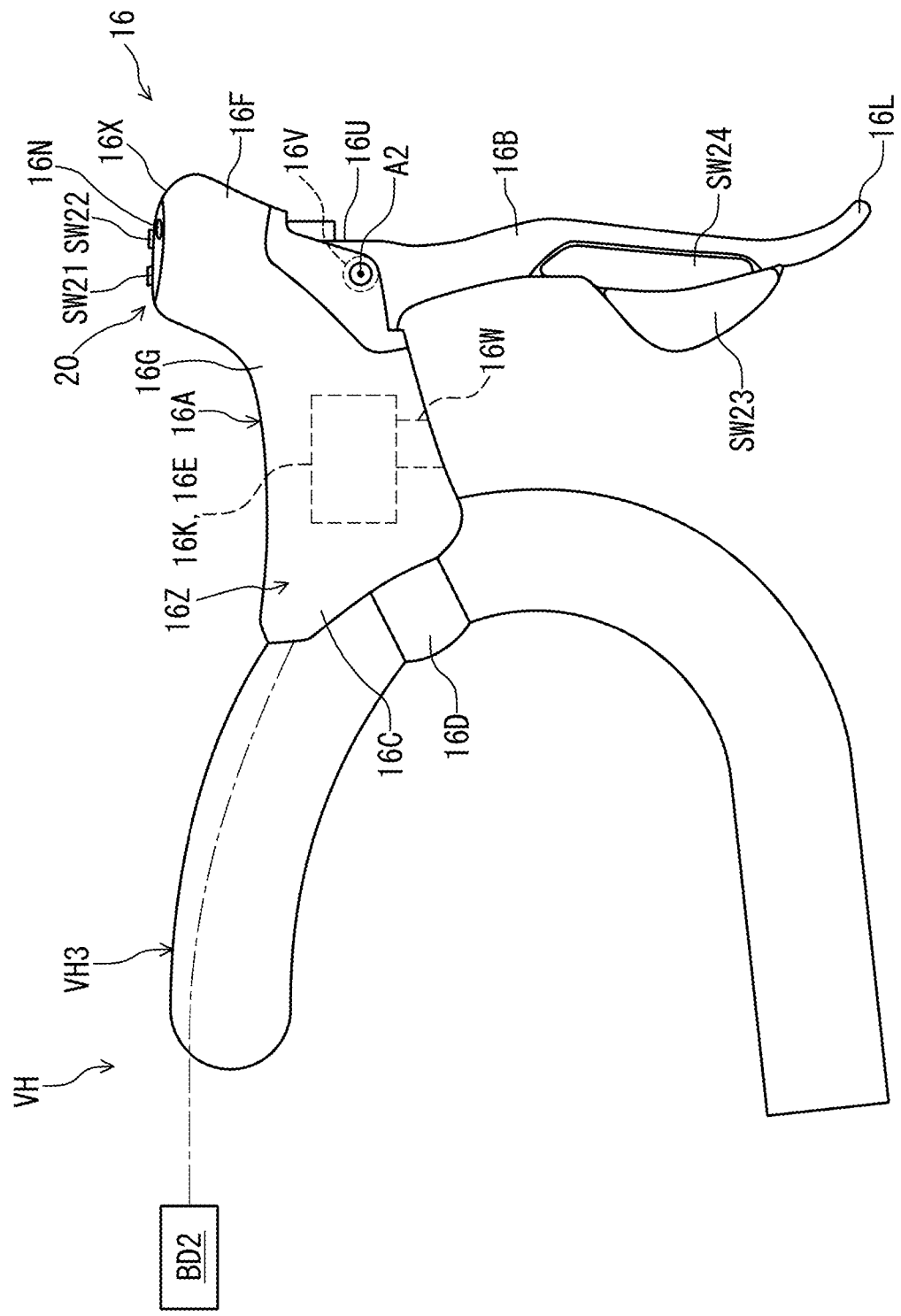
FIG. 6 is a side elevational view a second operating device of the operating system of the human-powered vehicle illustrated in FIG. 1.

As seen in FIG. 6, the second operating device 16 is configured to operate the second brake device BD2. The second operating device 16 comprises a second base member 16A and a second operating member 16B. The second base member 16A includes a second coupling end 16C and a second free end 16F. The second coupling end 16C is configured to be coupled to the handlebar VH3. The second free end 16F is opposite to the second coupling end 16C. The second operating member 16B is pivotally coupled to the second base member 16A about a second pivot axis A2. The second base member 16A is a separate member from the first base member 14A. In this embodiment, the second operating device 16 comprises a second clamp 16D configured to couple the second coupling end 16C to the handlebar VH3. The second base member 16A includes a second grip portion 16G. The second grip portion 16G is provided between the second coupling end 16C and the second free end 16F. The second grip portion 16G is configured to be gripped by a user. However, the second grip portion 16G can be omitted from the second base member 16A.

In this embodiment, the second operating member 16B includes a second lower end 16L and a second upper end 16U that is closer to the second base member 16A than the second lower end 16L. The second lower end 16L is positioned below the second upper end 16U while the second operating device 16 is mounted to the handlebar VH3. However, the structure of the second operating member 16B is not limited to this embodiment.

As seen in FIG. 3, the operating system 10 for the human-powered vehicle VH comprises a first user interface 18 and a second user interface 20. The first user interface 18 is configured to receive a first user input U1 and mounted to the first operating device 14. The second user interface 20 is configured to receive a second user input U2 and mounted to the second operating device 16. At least one of the first user interface 18 and the second user interface 20 is configured to be operated to control the assist driving unit DU configured to assist a human power. In this embodiment, the first user interface 18 and the second user interface 20 are configured to be operated to control the assist driving unit DU. However, one of the first user interface 18 and the second user interface 20 can be configured to be operated to control the assist driving unit DU.

The first user interface 18 includes at least one first switch configured to receive the first user input U1. The first user input U1 includes a first user operation input U11. The first user interface 18 includes a first electrical switch SW11 configured to receive the first user operation input U11. Namely, the at least one first switch includes the first electrical switch SW11 configured to receive the first user operation input U11.

The first user input U1 includes a first additional user operation input U12. The first user interface 18 includes a first additional electrical switch SW12 configured to receive the first additional user operation input U12. Namely, the at least one first switch includes the first additional electrical switch SW12 configured to receive the first additional user operation input U12.

The first user input U1 includes a first user operation input U13. The first user interface 18 includes a first electrical switch SW13 configured to receive the first user operation input U13. Namely, the at least one first switch includes the first electrical switch SW13 configured to receive the first user operation input U13.

The first user input U1 includes a first additional user operation input U14. The first user interface 18 includes a first additional electrical switch SW14 configured to receive the first additional user operation input U14. Namely, the at least one first switch includes the first additional electrical switch SW14 configured to receive the first additional user operation input U14.

Each of the first electrical switch SW11, the first additional electrical switch SW12, the first electrical switch SW13, and the first additional electrical switch SW14 includes a normally open switch. Examples of each of the first electrical switch SW11, the first additional electrical switch SW12, the first electrical switch SW13, and the first additional electrical switch SW14 includes a push-button switch and a lever switch. However, the structure of the first user interface 18 is not limited to this embodiment. The first user interface 18 can include another structure such as a touch panel instead of or in additional to the first electrical switch SW11, the first additional electrical switch SW12, the first electrical switch SW13, and/or the first additional electrical switch SW14.

In this embodiment, the first electrical switch SW11 can also be referred to as a first assist switch SW11. The first additional electrical switch SW12 can also be referred to as a second assist switch SW12. The first electrical switch SW13 can also be referred to as a second shift switch SW13. The first additional electrical switch SW14 can also be referred to as a first shift switch SW14. The first user operation input U11 can also be referred to a first user assist input U11. The first additional user operation input U12 can also be referred to a second user assist input U12. The first user operation input U13 can also be referred to a second user shift input U13. The first additional user operation input U14 can also be referred to a first user shift input U14.

The first assist switch SW11 is configured to receive the first user assist input U11 indicating an increase in the assist driving force of the assist driving unit DU. The second assist switch SW12 is configured to receive the second user assist input U12 indicating a decrease in the assist driving force of the assist driving unit DU. The first shift switch SW14 is configured to receive the first user shift input U14 indicating an increase in the gear ratio of the gear changing device GC. The second shift switch SW13 is configured to receive the second user shift input U13 indicating a decrease in the gear ratio of the gear changing device GC. However, the first assist switch SW11 can be configured to receive a user assist input indicating the decrease in the assist driving force of the assist driving unit DU. The second assist switch SW12 can be configured to receive a user assist input indicating the increase in the assist driving force of the assist driving unit DU. The first shift switch SW14 can be configured to receive a user shift input indicating the decrease in the gear ratio of the gear changing unit FD. The second shift switch SW13 can be configured to receive a user shift input indicating the increase in the gear ratio of the gear changing unit FD.

The first assist switch SW11 is mounted to one of the first operating device 14 and the second operating device 16. The second assist switch SW12 is mounted to one of the first operating device 14 and the second operating device 16. The second shift switch SW13 is mounted to one of the first operating device 14 and the second operating device 16. The first shift switch SW14 is mounted to one of the first operating device 14 and the second operating device 16.

In this embodiment, the at least one first switch is mounted to the first operating device 14. The first assist switch SW11 is mounted to the first operating device 14. The second assist switch SW12 is mounted to the first operating device 14. The first shift switch SW14 is mounted to the first operating device 14. The second shift switch SW13 is mounted to the first operating device 14. However, at least one of the first assist switch SW11, the second assist switch SW12, the first shift switch SW14, and the second shift switch SW13 can be mounted to the second operating device 16.

The operating system 10 for the human-powered vehicle VH comprises the first assist switch SW11 and the second assist switch SW12. The operating system 10 for the human-powered vehicle VH comprises the first shift switch SW14 and the second shift switch SW13. A total number of the at least one first switch of the first user interface 18 is four. However, the total number of the at least one first switch of the first user interface 18 is not limited to this embodiment. At least one of the first assist switch SW11, the second assist switch SW12, the first shift switch SW14, and the second shift switch SW13 can be omitted from the operating system 10.

As seen in FIG. 5, the first electrical switch SW13 and the first additional electrical switch SW14 are mounted to the first operating member 14B. The first base member 14A includes a pommel portion 14X provided at the first free end 14F. The pommel portion 14X upwardly extends from the first grip portion 14G in a state where the first operating device 14 is mounted to the handlebar VH3.

As seen in FIG. 4, the first base member 14A includes an inner lateral surface 14Y and an outer lateral surface 14Z. The inner lateral surface 14Y is provided between the outer lateral surface 14Z and the center plane VH6 of the human-powered vehicle VH. The first assist switch SW11 is mounted to at least one of the pommel portion 14X and the inner lateral surface 14Y of the first base member 14A. The first additional electrical switch SW12 is mounted to at least one of the pommel portion 14X and the inner lateral surface 14Y of the first base member 14A. In this embodiment, each of the first electrical switch SW11 and the first additional electrical switch SW12 is mounted to the pommel portion 14X. However, at least one of the first electrical switch SW11 and the first additional electrical switch SW12 can be mounted to the inner lateral surface 14Y or both the pommel portion 14X and the inner lateral surface 14Y of the first base member 14A. The locations of the first electrical switch SW11, the first additional electrical switch SW12, the first electrical switch SW13, and the first additional electrical switch SW14 are not limited to this embodiment.

As seen in FIG. 3, the second user interface 20 includes at least one second switch configured to receive a second user input U2. The second user input U2 includes a second user operation input U21. The second user interface 20 includes a second electrical switch SW21 configured to receive the second user operation input U21. Namely, the at least one second switch includes the second electrical switch SW21 configured to receive the second user operation input U21.

The second user input U2 includes a second additional user operation input U22. The second user interface 20 includes a second additional electrical switch SW22 configured to receive the second additional user operation input U22. Namely, the at least one second switch includes the second additional electrical switch SW22 is configured to receive the second additional user operation input U22.

The second user input U2 includes a second user operation input U23. The second user interface 20 includes a second electrical switch SW23 configured to receive the second user operation input U23. Namely, the at least one second switch includes the second electrical switch SW23 configured to receive the second user operation input U23.

The second user input U2 includes a second additional user operation input U24. The second user interface 20 includes a second additional electrical switch SW24 configured to receive the second additional user operation input U24. Namely, the at least one second switch includes the second additional electrical switch SW24 is configured to receive the second additional user operation input U24.

Each of the second electrical switch SW21, the second additional electrical switch SW22, the second electrical switch SW23, and the second additional electrical switch SW24 includes a normally open switch. Examples of each of the second electrical switch SW21, the second additional electrical switch SW22, the second electrical switch SW23, and the second additional electrical switch SW24 includes a push-button switch and a lever switch. However, the structure of the second user interface 20 is not limited to this embodiment. The second user interface 20 can include another structure such as a touch panel instead of or in additional to the second electrical switch SW21, the second additional electrical switch SW22, the second electrical switch SW23, and/or the second additional electrical switch SW24.

In this embodiment, the second electrical switch SW21 can also be referred to as a second assist switch SW21. The second additional electrical switch SW22 can also be referred to as a first assist switch SW22. The second electrical switch SW23 can also be referred to as a first shift switch SW23. The second additional electrical switch SW24 can also be referred to as a second shift switch SW24. The second user operation input U21 can also be referred to a second user assist input U21. The second additional user operation input U22 can also be referred to a first user assist input U22. The second user operation input U23 can also be referred to a first user shift input U23. The second additional user operation input U24 can also be referred to a second user shift input U24.

The first assist switch SW22 is configured to receive the first user assist input U11 indicating an increase in the assist driving force of the assist driving unit DU. The second assist switch SW21 is configured to receive the second user assist input U12 indicating a decrease in the assist driving force of the assist driving unit DU. The first shift switch SW23 is configured to receive the first user shift input U23 indicating an increase in the gear ratio of the gear changing device GC. The second shift switch SW24 is configured to receive the second user shift input U24 indicating a decrease in the gear ratio of the gear changing device GC. However, the second assist switch SW21 can be configured to receive a user assist input indicating the decrease in the assist driving force of the assist driving unit DU. The first assist switch SW22 can be configured to receive a user assist input indicating the increase in the assist driving force of the assist driving unit DU. The first shift switch SW23 can be configured to receive a user shift input indicating the decrease in the gear ratio of the gear changing unit RD. The second shift switch SW24 can be configured to receive a user shift input indicating the increase in the gear ratio of the gear changing unit RD.

The first assist switch SW22 is mounted to one of the first operating device 14 and the second operating device 16. The second assist switch SW21 is mounted to one of the first operating device 14 and the second operating device 16. The first shift switch SW23 is mounted to one of the first operating device 14 and the second operating device 16. The second shift switch SW24 is mounted to one of the first operating device 14 and the second operating device 16.

In this embodiment, the at least one second switch is mounted to the second operating device 16. The first assist switch SW22 is mounted to the second operating device 16. The second assist switch SW21 is mounted to the second operating device 16. The first shift switch SW23 is mounted to the second operating device 16. The second shift switch SW24 is mounted to the second operating device 16. However, at least one of the first assist switch SW22, the second assist switch SW21, the first shift switch SW23, and the second shift switch SW24 can be mounted to the first operating device 14.

The operating system 10 for the human-powered vehicle comprises the first assist switch SW22 and the second assist switch SW21. The operating system 10 for the human-powered vehicle comprises the first shift switch SW23 and the second shift switch SW24. A total number of the at least one second switch of the second user interface 20 is four. However, the total number of the at least one second switch of the second user interface 20 is not limited to this embodiment. At least one of the first assist switch SW22, the second assist switch SW21, the first shift switch SW23, and the second shift switch SW24 can be omitted from the operating system 10.

As seen in FIG. 6, the second electrical switch SW23 and the second additional electrical switch SW24 are mounted to the second operating member 16B. The second base member 16A includes a pommel portion 16X provided at the second free end 16F. The pommel portion 16X upwardly extends from the second grip portion 16G in a state where the second operating device 16 is mounted to the handlebar VH3.

As seen in FIG. 4, the second base member 16A includes an inner lateral surface 16Y and an outer lateral surface 16Z. The inner lateral surface 16Y is provided between the outer lateral surface 16Z and the center plane VH6 of the human-powered vehicle VH. The second electrical switch SW21 is mounted to at least one of the pommel portion 16X and an inner lateral surface 16Y of the second base member 16A. The second additional electrical switch SW22 is mounted to at least one of the pommel portion 16X and the inner lateral surface 16Y of the second base member 16A. In this embodiment, each of the second electrical switch SW21 and the second additional electrical switch SW22 is mounted to the pommel portion 16X. However, at least one of the second electrical switch SW21 and the second additional electrical switch SW22 can be mounted to the inner lateral surface 16Y or both the pommel portion 16X and the inner lateral surface 16Y of the second base member 16A. The locations of the second electrical switch SW21, the second additional electrical switch SW22, the second electrical switch SW23, and the second additional electrical switch SW24 are not limited to this embodiment.

As seen in FIG. 3, the first operating device 14 includes a first communicator 14K configured to transmit a control signal. The first communicator 14K is configured to be electrically connected to the first user interface 18. The first communicator 14K is configured to be electrically connected to the first electrical switch SW11 to generate and transmit a first control signal CS11 in response to the first user operation input U11. The first communicator 14K is configured to be electrically connected to the first additional electrical switch SW12 to generate and transmit a first additional control signal CS12 in response to the first additional user operation input U12. The first communicator 14K is configured to be electrically connected to the first electrical switch SW13 to generate and transmit a first control signal CS13 in response to the first user operation input U13. The first communicator 14K is configured to be electrically connected to the first additional electrical switch SW14 to generate and transmit the first additional control signal CS14 in response to the first additional user operation input U14.

As seen in FIG. 5, the first operating device 14 includes a first movement detector 14V configured to detect that the first operating member 14B is operated from a rest position relative to the first base member 14A. The first movement detector 14V is coupled to the first operating member 14B to detect the pivotal movement of the first operating member 14B. As seen in FIG. 3, the first movement detector 14V is configured to be electrically connected to the first communicator 14K. The first communicator 14K is configured to transmit a first detection signal CS15 if the first movement detector 14V detects that the first operating member 14B is operated from the rest position relative to the first base member 14A.

In this embodiment, the first communicator 14K includes a first wireless communicator WC1 configured to wirelessly transmit the signals CS11, CS12, CS13, CS14, and CS15. The first wireless communicator WC1 is configured to wirelessly receive information. The first wireless communicator WC1 is configured to be electrically connected to the first user interface 18. The first wireless communicator WC1 is configured to be electrically connected to the first electrical switch SW11 to generate and wirelessly transmit the first control signal CS11 in response to the first user operation input U11. The first wireless communicator WC1 is configured to be electrically connected to the first additional electrical switch SW12 to generate and wirelessly transmit the first additional control signal CS12 in response to the first additional user operation input U12. The first wireless communicator WC1 is configured to be electrically connected to the first electrical switch SW13 to generate and wirelessly transmit the first control signal CS13 in response to the first user operation input U13. The first wireless communicator WC1 is configured to be electrically connected to the first additional electrical switch SW14 to generate and wirelessly transmit the first additional control signal CS14 in response to the first additional user operation input U14. The first wireless communicator WC1 is configured to be electrically connected to the first movement detector 14V to generate and wirelessly transmit the first detection signal CS15 based on the detection result of the first movement detector 14V.

The first communicator 14K includes a first processor 14P, a first memory 14M, a first circuit board 14Q, and a first system bus 14R. The first processor 14P and the first memory 14M are electrically mounted on the first circuit board 14Q. The first processor 14P includes a central processing unit (CPU) and a memory controller. The first memory 14M is electrically connected to the first processor 14P. The first memory 14M includes a read only memory (ROM) and a random-access memory (RAM). The first memory 14M includes storage areas each having an address in the ROM and the RAM. The first processor 14P is configured to control the first memory 14M to store data in the storage areas of the first memory 14M and reads data from the storage areas of the first memory 14M. The first circuit board 14Q, the first electrical switch SW11, the first additional electrical switch SW12, the first electrical switch SW13, and the first additional electrical switch SW14 are electrically connected to the first system bus 14R. The first electrical switch SW11, the first additional electrical switch SW12, the first electrical switch SW13, and the first additional electrical switch SW14 are electrically connected to the first processor 14P and the first memory 14M with the first circuit board 14Q and the first system bus 14R. The first memory 14M (e.g., the ROM) stores a program. The program is read into the first processor 14P, and thereby the configuration and/or algorithm of the first communicator 14K is performed.

The first wireless communicator WC1 is electrically mounted on the first circuit board 14Q. The first wireless communicator WC1 is electrically connected to the first processor 14P and the first memory 14M with the first circuit board 14Q and the first system bus 14R. The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose a digital signal such as the signal CS11, CS12, CS13, CS14, or CS15 on carrier wave using a predetermined wireless communication protocol to wirelessly transmit the digital signal. In this embodiment, the first wireless communicator WC1 is configured to encrypt a signal such as the signal CS11, CS12, CS13, CS14, or CS15 using a cryptographic key to generate encrypted wireless signals.

The first wireless communicator WC1 is configured to receives a wireless signal via the antenna. In this embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The first operating device 14 includes a first electric power source 14E. The first electric power source 14E is configured to supply electricity to the first communicator 14K. The first electric power source 14E is configured to be electrically connected to the first communicator 14K. In this embodiment, the first electric power source 14E includes a first battery 14T and a first battery holder 14H. The first battery 14T includes a replaceable and/or rechargeable battery. The first battery holder 14H is configured to be electrically connected to the first communicator 14K via the first circuit board 14Q and the first system bus 14R. The first battery 14T is configured to be detachably attached to the first battery holder 14H. However, the first electric power source 14E is not limited to this embodiment. For example, the first electric power source 14E can include another component such as a capacitor and an electricity generation element (e.g., a piezoelectric element) instead of or in addition to the first battery 14T and the first battery holder 14H.

As seen in FIG. 3, the first operating device 14 includes a first notification device 14N. The first notification device 14N is configured to notify a user of first information relating to the first operating device 14. For example, the first notification device 14N is configured to notify a user of a remaining level of the first battery 14T or a communication state of the first communicator 14K. The first notification device 14N is configured to be electrically connected to the first communicator 14K. The first notification device 14N includes a light emitting element. The first communicator 14K is configured to turn the first notification device 14N on based on the first information. As seen in FIG. 4, the first notification device 14N is mounted to the pommel portion 14X of the first base member 14A.

As seen in FIG. 5, the first operating device 14 includes a first charging port 14W. The first charging port 14W is configured to electrically connect a charging cable to the first electric power source 14E. The first charging port 14W is configured to be electrically connected to the first battery holder 14H. The first charging port 14W is mounted to the first base member 14A. The location of the first charging port 14W is not limited to this embodiment.

As seen in FIG. 6, the second operating device 16 includes a second communicator 16K configured to transmit a control signal. The second communicator 16K is configured to be electrically connected to the second user interface 20. The second communicator 16K is configured to be electrically connected to the second electrical switch SW21 to generate and transmit a second control signal CS21 in response to the second user operation input U21. The second communicator 16K is configured to be electrically connected to the second additional electrical switch SW22 to generate and transmit a second additional control signal CS22 in response to the second additional user operation input U22. The second communicator 16K is configured to be electrically connected to the second electrical switch SW23 to generate and transmit a second control signal CS23 in response to the second user operation input U23. The second communicator 16K is configured to be electrically connected to the second additional electrical switch SW24 to generate and transmit the second additional control signal CS24 in response to the second additional user operation input U24.

As seen in FIG. 6, the second operating device 16 includes a second movement detector 16V configured to detect that the second operating member 16B is operated from a rest position relative to the second base member 16A. The second movement detector 16V is coupled to the second operating member 16B to detect the pivotal movement of the second operating member 16B. As seen in FIG. 3, the second movement detector 16V is configured to be electrically connected to the second communicator 16K. The second communicator 16K is configured to transmit a second detection signal CS25 if the second movement detector 16V detects that the second operating member 16B is operated from the rest position relative to the second base member 16A.

In this embodiment, the second communicator 16K includes a second wireless communicator WC2 configured to wirelessly transmit the signals CS21, CS22, CS23, CS24, and CS25. The second wireless communicator WC2 is configured to wirelessly receive information. The second wireless communicator WC2 is configured to be electrically connected to the second user interface 20. The second wireless communicator WC2 is configured to be electrically connected to the second electrical switch SW21 to generate and wirelessly transmit the second control signal CS21 in response to the second user operation input U21. The second wireless communicator WC2 is configured to be electrically connected to the second additional electrical switch SW22 to generate and wirelessly transmit the second additional control signal CS22 in response to the second additional user operation input U22. The second wireless communicator WC2 is configured to be electrically connected to the second electrical switch SW23 to generate and wirelessly transmit the second control signal CS23 in response to the second user operation input U23. The second wireless communicator WC2 is configured to be electrically connected to the second additional electrical switch SW24 to generate and wirelessly transmit the second additional control signal CS24 in response to the second additional user operation input U24. The second wireless communicator WC2 is configured to be electrically connected to the second movement detector 16V to generate and wirelessly transmit the second detection signal CS25 based on the detection result of the second movement detector 16V.

The second communicator 16K includes a second processor 16P, a second memory 16M, a second circuit board 16Q, and a second system bus 16R. The second processor 16P and the second memory 16M are electrically mounted on the second circuit board 16Q. The second processor 16P includes a central processing unit (CPU) and a memory controller. The second memory 16M is electrically connected to the second processor 16P. The second memory 16M includes a read only memory (ROM) and a random-access memory (RAM). The second memory 16M includes storage areas each having an address in the ROM and the RAM. The second processor 16P is configured to control the second memory 16M to store data in the storage areas of the second memory 16M and reads data from the storage areas of the second memory 16M. The second circuit board 16Q, the second electrical switch SW21, the second additional electrical switch SW22, the second electrical switch SW23, and the second additional electrical switch SW24 are electrically connected to the second system bus 16R. The second electrical switch SW21, the second additional electrical switch SW22, the second electrical switch SW23, and the second additional electrical switch SW24 are electrically connected to the second processor 16P and the second memory 16M with the second circuit board 16Q and the second system bus 16R. The second memory 16M (e.g., the ROM) stores a program. The program is read into the second processor 16P, and thereby the configuration and/or algorithm of the second communicator 16K is performed.

The second wireless communicator WC2 is electrically mounted on the second circuit board 16Q. The second wireless communicator WC2 is electrically connected to the second processor 16P and the second memory 16M with the second circuit board 16Q and the second system bus 16R. The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose a digital signal such as the signal CS21, CS22, CS23, CS24, or CS25 on carrier wave using a predetermined wireless communication protocol to wirelessly transmit the digital signal. In this embodiment, the second wireless communicator WC2 is configured to encrypt a signal such as the signal CS21, CS22, CS23, CS24, or CS25 using a cryptographic key to generate encrypted wireless signals.

The second wireless communicator WC2 is configured to receives a wireless signal via the antenna. In this embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

The second operating device 16 includes a second electric power source 16E. The second electric power source 16E is configured to supply electricity to the second communicator 16K. The second electric power source 16E is configured to be electrically connected to the second communicator 16K. In this embodiment, the second electric power source 16E includes a second battery 16T and a second battery holder 16H. The second battery 16T includes a replaceable and/or rechargeable battery. The second battery holder 16H is configured to be electrically connected to the second communicator 16K via the second circuit board 16Q and the second system bus 16R. The second battery 16T is configured to be detachably attached to the second battery holder 16H. However, the second electric power source 16E is not limited to this embodiment. For example, the second electric power source 16E can include another component such as a capacitor and an electricity generation element (e.g., a piezoelectric element) instead of or in addition to the second battery 16T and the second battery holder 16H.

As seen in FIG. 3, the second operating device 16 includes a second notification device 16N. The second notification device 16N is configured to notify a user of second information relating to the second operating device 16. For example, the second notification device 16N is configured to notify a user of a remaining level of the second battery 16T or a communication state of the second communicator 16K. The second notification device 16N is configured to be electrically connected to the second communicator 16K. The second notification device 16N includes a light emitting element. The second communicator 16K is configured to turn the second notification device 16N on based on the second information. As seen in FIG. 4, the second notification device 16N is mounted to the pommel portion 16X of the second base member 16A.

As seen in FIG. 6, the second operating device 16 includes a second charging port 16W. The second charging port 16W is configured to electrically connect a charging cable to the second electric power source 16E. The second charging port 16W is configured to be electrically connected to the second battery holder 16H. The second charging port 16W is mounted to the second base member 16A. The location of the second charging port 16W is not limited to this embodiment.

As seen in FIG. 3, the operating system 10 further comprises a controller 22. The controller 22 is configured to be communicate with the first operating device 14 and the second operating device 16. In this embodiment, the controller 22 is configured to be mounted to the gear changing device GC. More specifically, the controller 22 is configured to be mounted to the gear changing unit RD. However, the controller 22 can be mounted to another device such as the first operating device 14, the second operating device 16, the gear changing unit FD, the assist driving unit DU, and the power supply PS.

The controller 22 includes a processor 22P, a memory 22M, a circuit board 22C, and a system bus 22D. The processor 22P and the memory 22M are electrically mounted on the circuit board 22C. The processor 22P includes a CPU and a memory controller. The memory 22M is electrically connected to the processor 22P. The memory 22M includes a ROM and a RAM. The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores a program. The program is read into the processor 22P, and thereby the configuration and/or algorithm of the communicator 22B is performed.

The controller 22 includes a communicator 22B. The communicator 22B is configured to communicate with the first communicator 14K. The communicator 22B is configured to communicate with the second communicator 16K.

In this embodiment, the controller 22 is configured to receive the first control signal CS11, the first additional control signal CS12, the first control signal CS13, the first additional control signal CS14, and the first detection signal CS15 from the first operating device 14. The controller 22 is configured to receive the second control signal CS21, the second additional control signal CS22, the second control signal CS23, the second additional control signal CS24, and the second detection signal CS25 from the second operating device 16.

In this embodiment, the communicator 22B includes a wireless communicator WC3 configured to wirelessly receive signals or other information from the wireless communicators WC1 and WC2. The wireless communicator WC3 is configured to wirelessly transmit signals or other information to the wireless communicators WC1 and WC2.

The wireless communicator WC3 is electrically mounted on the circuit board 22C. The wireless communicator WC3 is electrically connected to the processor 22P and the memory 22M with the circuit board 22C and the system bus 22D. The wireless communicator WC3 includes a signal transmitting circuit, a signal receiving circuit, and an antenna. Thus, the wireless communicator WC3 can also be referred to as a wireless communication circuit WC3.

The wireless communicator WC3 is configured to superimpose a digital signal on carrier wave using a predetermined wireless communication protocol to wirelessly transmit the digital signal. In this embodiment, the wireless communicator WC3 is configured to encrypt a signal using a cryptographic key to generate encrypted wireless signals.

The wireless communicator WC3 is configured to receive a wireless signal via the antenna. In this embodiment, the wireless communicator WC3 is configured to decode the wireless signal to recognize each of the signals CSl1 to CS15 and CS21 to CS25 which are wirelessly transmitted from the first wireless communicator WC1 and the second wireless communicator WC2. The wireless communicator WC3 is configured to decrypt the wireless signal using the cryptographic key.

The controller 22 is configured to generate a first control command CC11 based on the first control signal CS11. The controller 22 is configured to generate a first additional control command CC12 based on the first additional control signal CS12. The controller 22 is configured to generate a first control command CC13 based on the first control signal CS13. The controller 22 is configured to generate a first additional control command CC14 based on the first additional control signal CS14. Thus, the controller 22 is configured to generate the first control command CC11 based on the first user operation input U11. The controller 22 is configured to generate the first additional control command CC12 based on the first additional user operation input U12. The controller 22 is configured to generate the first control command CC13 based on the first user operation input U13. The controller 22 is configured to generate the first additional control command CC14 based on the first additional user operation input U14.

The controller 22 is configured to generate a second control command CC21 based on the second control signal CS21. The controller 22 is configured to generate a second additional control command CC22 based on the second additional control signal CS22. The controller 22 is configured to generate a second control command CC23 based on the second control signal CS23. The controller 22 is configured to generate a second additional control command CC24 based on the second additional control signal CS24. Thus, the controller 22 is configured to generate the second control command CC21 based on the second user operation input U21. The controller 22 is configured to generate the second additional control command CC22 based on the second additional user operation input U22. The controller 22 is configured to generate the second control command CC23 based on the second user operation input U23. The controller 22 is configured to generate the second additional control command CC24 based on the second additional user operation input U24.

The controller 22 is configured to control the assist driving unit DU to change the assist driving force generated by the assist driving unit DU based on at least one of the first user input U1 and the second user input U2. The controller 22 is configured to control the assist driving unit DU to change the assist driving force based on at least one of the first user operation input U11 and the second user operation input U21. The controller 22 is configured to control the assist driving unit DU to change the assist driving force based on at least one of the first additional user operation input U12 and the second additional user operation input U22. The controller 22 is configured to control the assist driving unit DU to change the assist driving force based on at least one of the first user operation input U11, the second user operation input U21, and the second additional user operation input U22. The controller 22 is configured to control the assist driving unit DU to change the assist driving force based on at least one of the first user operation input U11, the first additional user operation input U12, the second user operation input U21, and the second additional user operation input U22.

In this embodiment, the controller 22 is configured to control the assist driving unit DU to change the assist driving force based on the first user operation input U11. The controller 22 is configured to control the assist driving unit DU to change the assist driving force based on the first additional user operation input U12. The controller 22 is configured to control the assist driving unit DU to increase the assist driving force based on one of the first user operation input U11 and the first additional user operation input U12. The controller 22 is configured to control the assist driving unit DU to decrease the assist driving force based on the other of the first user operation input U11 and the first additional user operation input U12.

The controller 22 is configured to control the assist driving unit DU to increase the assist driving force based on one of the first user operation input U11 and the second user operation input U21. The controller 22 is configured to control the assist driving unit DU to decrease the assist driving force based on the other of the first user operation input U11 and the second user operation input U21. The controller 22 is configured to control the assist driving unit DU to increase the assist driving force based on one of the first additional user operation input U12 and the second additional user operation input U22. The controller 22 is configured to control the assist driving unit DU to decrease the assist driving force based on the other of the first additional user operation input U12 and the second additional user operation input U22.

In this embodiment, the controller 22 is configured to control the assist driving unit DU to increase the assist driving force based on the first user assist input U11. The controller 22 is configured to control the assist driving unit DU to decrease the assist driving force based on the second user assist input U12. The controller 22 is configured to control the assist driving unit DU to increase the assist driving force based on the first user assist input U22. The controller 22 is configured to control the assist driving unit DU to decrease the assist driving force based on the second user assist input U21.

More specifically, the controller 22 is configured to control the assist driving unit DU to increase the assist driving force based on the first control signal CS11. The controller 22 is configured to control the assist driving unit DU to decrease the assist driving force based on the first additional control signal CS12. The controller 22 is configured to control the assist driving unit DU to decrease the assist driving force based on the second control signal CS21. The controller 22 is configured to control the assist driving unit DU to increase the assist driving force based on the second additional control signal CS22.

Furthermore, the controller 22 is configured to control the gear changing device GC to change the gear ratio of the gear changing device GC based on the first user operation input U13. The controller 22 is configured to control the gear changing device GC to change the gear ratio of the gear changing device GC based on the first additional user operation input U14. The controller 22 is configured to control the gear changing device GC to change the gear ratio of the gear changing device GC based on the second user operation input U23. The controller 22 is configured to control the gear changing device GC to change the gear ratio of the gear changing device GC based on the second additional user operation input U24.

In this embodiment, the controller 22 is configured to control the gear changing device GC to increase the gear ratio of the gear changing device GC based on one of the first additional user operation input U14 and the second additional user operation input U24. The controller 22 is configured to control the gear changing device GC to decrease the gear ratio of the gear changing device GC based on the other of the first additional user operation input U14 and the second additional user operation input U24.

The controller 22 is configured to control the gear changing device GC to increase the gear ratio of the gear changing device GC based on one of the second user operation input U23 and the second additional user operation input U24. The controller 22 is configured to control the gear changing device GC to decrease the gear ratio of the gear changing device GC based on the other of the second user operation input U23 and the second additional user operation input U24.

Thus, the controller 22 is configured to control the gear changing device GC to increase the gear ratio of the gear changing device GC based on the first user shift input U14. The controller 22 is configured to control the gear changing device GC to decrease the gear ratio of the gear changing device GC based on the second user shift input U13. The controller 22 is configured to control the gear changing device GC to increase the gear ratio of the gear changing device GC based on the first user shift input U23. The controller 22 is configured to control the gear changing device GC to decrease the gear ratio of the gear changing device GC based on the second user shift input U24.

More specifically, the controller 22 is configured to control the gear changing unit FD to decrease the gear ratio of the gear changing device GC based on the first control signal CS13. The controller 22 is configured to control the gear changing unit FD to increase the gear ratio of the gear changing device GC based on the first additional control signal CS14. The controller 22 is configured to control the gear changing unit RD to increase the gear ratio of the gear changing device GC based on the second control signal CS23. The controller 22 is configured to control the gear changing unit RD to decrease the gear ratio of the gear changing device GC based on the second additional control signal CS24.

Namely, the first user operation input U11, the first control signal CS11, and the first control command CC11 indicate increasing of the assist driving force of the assist driving unit DU. The first additional user operation input U12, the first additional control signal CS12, and the first additional control command CC12 indicate decreasing of the assist driving force of the assist driving unit DU. The first user operation input U13, the first control signal CS13, and the first control command CC13 indicate downshifting of the gear changing unit FD. The first additional user operation input U14, the first additional control signal CS14, and the first additional control command CC14 indicate upshifting of the gear changing unit FD.

However, the first user operation input U11, the first control signal CS11, and the first control command CC11 can indicate decreasing of the assist driving force of the assist driving unit DU, or another command to operate another electric component such as the gear changing unit FD, the gear changing unit RD, an adjustable seatpost, an internal gear hub, a front suspension, a rear suspension, a cycle computer, a smartphone, a tablet computer, or a light emitting device. The first additional user operation input U12, the first additional control signal CS12, and the first additional control command CC12 can indicate increasing of the assist driving force of the assist driving unit DU, or another command to operate another electric component such as the gear changing unit FD, the gear changing unit RD, an adjustable seatpost, an internal gear hub, a front suspension, a rear suspension, a cycle computer, a smartphone, a tablet computer, or a light emitting device. The first user operation input U13, the first control signal CS13, and the first control command CC13 can indicate upshifting of the gear changing unit FD, or another command to operate another electric component such as the gear changing unit RD, the assist driving unit DU, an adjustable seatpost, an internal gear hub, a front suspension, a rear suspension, a cycle computer, a smartphone, a tablet computer, or a light emitting device. The first additional user operation input U14, the first additional control signal CS14, and the first additional control command CC14 can indicate downshifting of the gear changing unit FD, or another command to operate another electric component such as the gear changing unit RD, the assist driving unit DU, an adjustable seatpost, an internal gear hub, a front suspension, a rear suspension, a cycle computer, a smartphone, a tablet computer, or a light emitting device.

In this embodiment, the second user operation input U21, the second control signal CS21, and the second control command CC21 indicate decreasing of the assist driving force of the assist driving unit DU. The second additional user operation input U22, the second additional control signal CS22, and the second additional control command CC22 indicate increasing of the assist driving force of the assist driving unit DU. The second user operation input U23, the second control signal CS23, and the second control command CC23 indicate downshifting of the gear changing unit RD. The second additional user operation input U24, the second additional control signal CS24, and the second additional control command CC24 indicate upshifting of the gear changing unit RD.

However, the second user operation input U21, the second control signal CS21, and the second control command CC21 can indicate increasing of the assist driving force of the assist driving unit DU, or another command to operate another electric component such as the gear changing unit FD, the gear changing unit RD, an adjustable seatpost, an internal gear hub, a front suspension, a rear suspension, a cycle computer, a smartphone, a tablet computer, or a light emitting device. The second additional user operation input U22, the second additional control signal CS22, and the second additional control command CC22 can indicate decreasing of the assist driving force of the assist driving unit DU, or another command to operate another electric component such as the gear changing unit FD, the gear changing unit RD, an adjustable seatpost, an internal gear hub, a front suspension, a rear suspension, a cycle computer, a smartphone, a tablet computer, or a light emitting device. The second user operation input U23, the second control signal CS23, and the second control command CC23 can indicate downshifting of the gear changing unit RD, or another command to operate another electric component such as the gear changing unit FD, the assist driving unit DU, an adjustable seatpost, an internal gear hub, a front suspension, a rear suspension, a cycle computer, a smartphone, a tablet computer, or a light emitting device. The second additional user operation input U24, the second additional control signal CS24, and the second additional control command CC24 can indicate upshifting of the gear changing unit RD, or another command to operate another electric component such as the gear changing unit FD, the assist driving unit DU, an adjustable seatpost, an internal gear hub, a front suspension, a rear suspension, a cycle computer, a smartphone, a tablet computer, or a light emitting device.

As seen in FIG. 3, the motor controller DU3 is configured to control the assist motor DU1 to increase the assist driving force of the assist motor DU1 based on the first control command CC11 or the second additional control command CC22. The motor controller DU3 is configured to control the assist motor DU1 to decrease the assist driving force of the assist motor DU1 based on the first additional control command CC12 or the second control command CC21.

The motor controller DU3 is configured to store a plurality of assist ratios. For example, the plurality of assist ratios includes a first assist ratio, a second assist ratio, and a third assist ratio. The first assist ratio is lower than the second assist ratio. The third assist ratio is higher than the second assist ratio. The motor controller DU3 is configured to calculate an assist driving force based on the selected assist ratio and the pedaling force sensed by the pedaling-force sensor DU2. The motor controller DU3 is configured to control the assist motor DU1 to apply the calculated assist driving force to the drive train VH5.

The motor controller DU3 is configured to select one of the first to third assist ratios based on the control commands CC11, CC12, CC21, and CC22. The motor controller DU3 is configured to select an assist ratio higher than the current assist ratio by one step in response to the first control command CC11 or the second additional control command CC22. The motor controller DU3 is configured to select an assist ratio lower than the current assist ratio by one step in response to the first additional control command CC12 or the second control command CC21. For example, the motor controller DU3 is configured to select the second assist ratio in response to the first control command CC11 or the second additional control command CC22 when the current assist ratio is the first assist ratio. The motor controller DU3 is configured to select the third assist ratio in response to the first control command CC11 or the second additional control command CC22 when the current assist ratio is the second assist ratio. The motor controller DU3 is configured to select the second assist ratio in response to the first additional control command CC12 or the second control command CC21 when the current assist ratio is the third assist ratio. The motor controller DU3 is configured to select the first assist ratio in response to the first additional control command CC12 or the second control command CC21 when the current assist ratio is the second assist ratio.

As seen in FIG. 3, the gear changing unit RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is configured to guide the chain C. The chain guide RD2 is movably coupled to the base member RD1 and is configured to engage with the chain C when shifting the chain C relative to the rear sprocket assembly RS. The actuator RD3 is configured to move the chain guide RD2 relative to the base member RD1 to shift the chain C relative to the rear sprocket assembly RS. Examples of the actuator RD3 include a direct current motor and a stepper motor.

The actuator driver RD5 is electrically connected to the actuator RD3 to control the actuator RD3 based on the second control command CC23 and the second additional control command CC24 generated by the controller 22. Examples of the actuator RD3 include a direct-current (DC) motor and a stepper motor. The actuator RD3 includes a rotational shaft operatively coupled to the chain guide RD2. The position sensor RD4 is configured to sense a current gear position of the gear changing unit RD. Examples of the position sensor RD4 include a potentiometer and a rotary encoder. The position sensor RD4 is configured to sense an absolute rotational position of the rotational shaft of the actuator RD3 as the current gear position of the gear changing unit RD. The actuator RD3 and the position sensor RD4 are electrically connected to the actuator driver RD5.

The actuator driver RD5 is configured to control the actuator RD3 to move the chain guide RD2 relative to the base member RD1 by one gear position in a downshift direction based on the second control command CC23 and the current gear position sensed by the position sensor RD4. The actuator driver RD5 is configured to control the actuator RD3 to move the chain guide RD2 relative to the base member RD1 by one gear position in an upshift direction based on the second additional control command CC24 and the current gear position sensed by the position sensor RD4.

As seen in FIG. 3, the gear changing unit FD includes a base member FD11, a chain guide FD2, an actuator FD3, a position sensor FD4, and an actuator driver FD5. The base member FD1 is mounted to the vehicle body VH1 (see e.g., FIG. 1). The chain guide RD1 is configured to guide the chain C. The chain guide FD2 is movably coupled to the base member FD1 and is configured to contact the chain C when shifting the chain C relative to the front sprocket assembly FS. The actuator FD3 is configured to move the chain guide FD2 relative to the base member FD1 to shift the chain C relative to the front sprocket assembly FS. Examples of the actuator FD3 include a direct current motor and a stepper motor.

The actuator driver FD5 is electrically connected to the actuator FD3 to control the actuator FD3 based on the first control command CC13 and the first additional control command CC14 generated by the controller 22. Examples of the actuator FD3 include a direct-current (DC) motor and a stepper motor. The actuator FD3 includes a rotational shaft operatively coupled to the chain guide FD2. The position sensor FD4 is configured to sense a current gear position of the gear changing unit FD. Examples of the position sensor FD4 include a potentiometer and a rotary encoder. The position sensor FD4 is configured to sense an absolute rotational position of the rotational shaft of the actuator FD3 as the current gear position of the gear changing unit FD. The actuator FD3 and the position sensor FD4 are electrically connected to the actuator driver FD5.

The actuator driver FD5 is configured to control the actuator FD3 to move the chain guide FD2 relative to the base member FD1 by one gear position in a downshift direction based on the first control command CC13 and the current gear position sensed by the position sensor FD4. The actuator driver FD5 is configured to control the actuator FD3 to move the chain guide FD2 relative to the base member FD1 by one gear position in an upshift direction based on the first additional control command CC14 and the current gear position sensed by the position sensor FD4.

As seen in FIG. 2, the controller 22, the assist driving unit DU, the gear changing unit FD, and the gear changing unit RD communicate with each other via the electric communication path CP using power line communication (PLC) technology. More specifically, each of the electric cables of the electric communication path CP includes a ground line and a voltage line that are detachably connected to a serial bus that is formed by communication interfaces and the junction. In this embodiment, the controller 22, the gear changing unit RD, the gear changing unit FD, and the assist driving unit DU can all communicate with each other through the voltage line using the PLC technology.

As seen in FIG. 3, the control commands CC13 and CC14 are transmitted from the controller 22 to the gear changing unit FD through the electric communication path CP. The control commands CC11, CC12, CC21, and CC22 are transmitted from the controller 22 to the assist driving unit DU through the electric communication path CP. However, the gear changing unit FD can include a wireless communicator configured to wirelessly receive the first control signal CS13 and the first additional control signal CS14 from the operating system 10. The assist driving unit DU can include a wireless communicator configured to wirelessly receive the control commands CC11, CC12, CC21, and CC22 from the operating system 10. In such embodiment, the electric communication path CP can be omitted from the human-powered vehicle VH. The assist driving unit DU can use the power supply PS, and each of the gear changing unit FD and the gear changing unit RD can include another power supply.

The PLC technology is used for communicating between electric components. The PLC carries data on a conductor that is also used simultaneously for electric power transmission or electric power distribution to the electric components. In this embodiment, electricity is supplied from the power supply PS to the gear changing unit FD, the gear changing unit RD, and the assist driving unit DU via the electric communication path CP. Furthermore, the controller 22 can receive information signals from the gear changing unit RD, the gear changing unit FD, the assist driving unit DU, and the power supply PS through the electric communication path CP using the PLC.

The PLC uses unique identifying information such as a unique identifier that is assigned to each of the assist driving unit DU, the gear changing unit FD, the gear changing unit RD, and the power supply PS. Each of the electric components DU, FD, RD, and PS includes a memory in which the unique identifying information is stored. Based on the unique identifying information, each of the electric components DU, FD, RD, and PS is configured to recognize, based on the unique identifying information, information signals which are necessary for itself among information signals transmitted via the electric communication path CP. For example, the controller 22 is configured to recognize information signals transmitted from the assist driving unit DU, the gear changing unit FD, the gear changing unit RD, and the power supply PS with the electric communication path CP. Instead of using the PLC technology, however, separate signal wires can be provided for transmitting data in addition to the ground wire and the voltage wire if needed and/or desired.

The communicator 22B includes a PLC controller PC1. The PLC controller PC1 is connected to the electric communication path CP, the gear changing unit RD, and the system bus 22D. The PLC controller PC is configured to separate input signals to a power source voltage and control signals. The PLC controller PC1 is configured to regulate the power source voltage to a level at which the controller 22 and the gear changing unit RD can properly operate. The PLC controller PC1 is further configured to superimpose output signals such as the second control command CC21 and the second additional control command CC22 on the power source voltage applied to the electric communication path CP from the power supply PS. The memory 22M is configured to store the unique identifying information of the controller 22 and the gear changing unit RD.

The gear changing unit FD includes a PLC controller PC2. The assist driving unit DU includes a PLC controller PC3. The PLC controllers PC2 and PC3 have substantially the same structure as the structure of the PLC controller PC1. Thus, they will not be described in detail for the sake of brevity.

The controller 22 is configured to control the brake lamp BL. The controller 22 is configured to turn the brake lamp BL on while the controller 22 receives the first detection signal CS15 and/or the second detection signal CS25. The controller 22 is configured to turn the brake lamp BL off while the controller 22 does not receive both the first detection signal CS15 and the second detection signal CS25.

Second Embodiment

An operating system 210 in accordance with a second embodiment will be described below referring to FIG. 7. The operating system 210 has the same structure and/or configuration as those of the operating system 10 except for the first user interface 18, the second user interface 20, and the controller 22. Thus, elements having substantially the same function as those in the first embodiment will be numbered the same here and will not be described and/or illustrated again in detail here for the sake of brevity.

Figure 7:
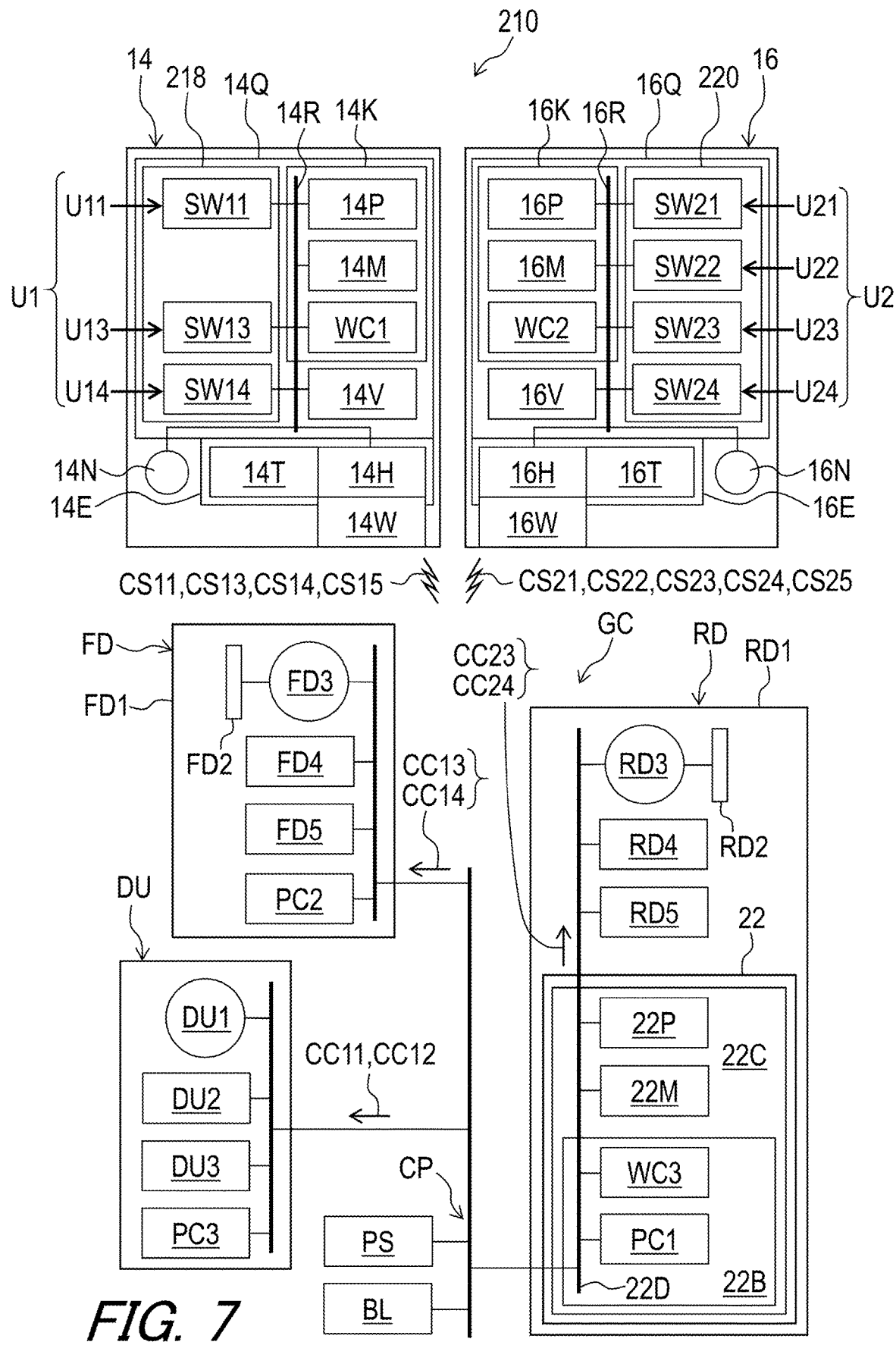
FIG. 7 is a schematic block diagram of a human-powered vehicle in accordance with a second embodiment.

As seen in FIG. 7, the operating system 210 for the human-powered vehicle comprises the first operating device 14, the second operating device 16, a first user interface 218, and a second user interface 220. The operating system 210 further comprises a controller 222. The first user interface 218 has substantially the same structure as the structure of the first user interface 18 of the first embodiment. The second user interface 220 has substantially the same structure as the structure of the second user interface 20 of the first embodiment. The controller 222 has substantially the same structure as the structure of the controller 22 of the first embodiment.

The first user interface 218 is configured to receive the first user input U1 and mounted to the first operating device 14. At least one of the first user interface 218 and the second user interface 20 is configured to be operated to control the assist driving unit DU configured to assist a human power. The first user interface 218 is configured to receive the first user input U1 and mounted to the first operating device 14. The second user interface 220 is configured to receive the second user input U2 and mounted to the second operating device 16. The first user interface 218 includes at least one first switch configured to receive the first user input U1. The second user interface 220 includes at least one second switch configured to receive the second user input U2.

In this embodiment, a total number of the at least one first switch of the first user interface 218 is different from a total number of the at least one second switch of the second user interface 220. The first additional electrical switch SW12 is omitted from the first user interface 218. The at least one first switch includes the first electrical switch SW11, the first electrical switch SW13, and the first additional electrical switch SW14. The at least one second switch includes the second electrical switch SW21, the second additional electrical switch SW22, the second electrical switch SW23, and the second additional electrical switch SW24. The total number of the at least one first switch of the first user interface 218 is three while the total number of the at least one second switch of the second user interface 220 is four.

As with the first embodiment, the controller 222 is configured to control the gear changing device GC to increase the gear ratio of the gear changing device GC based on one of the second user operation input U23 and the second additional user operation input U24. The controller 222 is configured to control the gear changing device GC to decrease the gear ratio of the gear changing device GC based on the other of the second user operation input U23 and the second additional user operation input U24. In this embodiment, the controller 222 is configured to control the gear changing device GC to increase the gear ratio of the gear changing device GC based on the second user operation input U23. The controller 222 is configured to control the gear changing device GC to decrease the gear ratio of the gear changing device GC based on the second additional user operation input U24.

In this embodiment, the controller 222 is configured to control the assist driving unit DU to change the assist driving force generated by the assist driving unit DU based on at least one of the first user input U1 and the second user input U2. The controller 222 is configured to control the assist driving unit DU to change the assist driving force based on a combination of the first user input U1 and the second user input U2. More specifically, the controller 222 is configured to control the assist driving unit DU to change the assist driving force based on at least one of the first user operation input U11, the second user operation input U23, and the second additional user operation input U24. The controller 222 is configured to control the assist driving unit DU to change the assist driving force based on a first combination of the first user operation input U11 and the second user operation input U23. The controller 222 is configured to control the assist driving unit DU to change the assist driving force based on a second combination of the first user operation input U11 and the second additional user operation input U24.

The controller 222 is configured to control the assist driving unit DU to increase the assist driving force based on the first combination of the first user operation input U11 and the second user operation input U23. The controller 222 is configured to control the assist driving unit DU to decrease the assist driving force based on the second combination of the first user operation input U11 and the second additional user operation input U24. The controller 222 is configured to control the assist driving unit DU to increase the assist driving force based on the first combination of the first control signal CS11 and the second control signal CS23. The controller 222 is configured to control the assist driving unit DU to decrease the assist driving force based on the second combination of the first control signal CS11 and the second additional control signal CS24.

The controller 222 is configured to control the assist driving unit DU to change the assist driving force based on the first user operation input U11 and the second user operation input U23 which are respectively received by the first electrical switch SW11 and the second electrical switch SW23 within a determination time. The controller 222 is configured to control the assist driving unit DU to change the assist driving force based on the first user operation input U11 and the second additional user operation input U24 which are respectively received by the first electrical switch SW11 and the second additional electrical switch SW24 within the determination time. The controller 222 is configured to control the assist driving unit DU to change the assist driving force based on the first control signal CS11 and the second control signal CS23 which are received by the controller 222 within a determination time. The controller 222 is configured to control the assist driving unit DU to change the assist driving force based on the first control signal CS11 and the second additional control signal CS24 which are received by the controller 222 within the determination time.

In this embodiment, the controller 222 is configured to generate the first control command CC11 when the controller 222 receives the first control signal CS11 and the second control signal CS23 within the determination time. The controller 222 is configured to generate the first additional control command CC12 when the controller 222 receives the first control signal CS11 and the second additional control signal CS24 within the determination time.

The controller 222 is configured to control another electric component other than the assist driving unit DU based on the second user operation input U21 and the second additional user operation input U22. For example, the controller 222 is configured to control, based on the second user operation input U21 and the second additional user operation input U22, another electric component such as the gear changing unit FD, the gear changing unit RD, an adjustable seatpost, an internal gear hub, a front suspension, a rear suspension, a cycle computer, a smartphone, a tablet computer, or a light emitting device.

Figure 8:
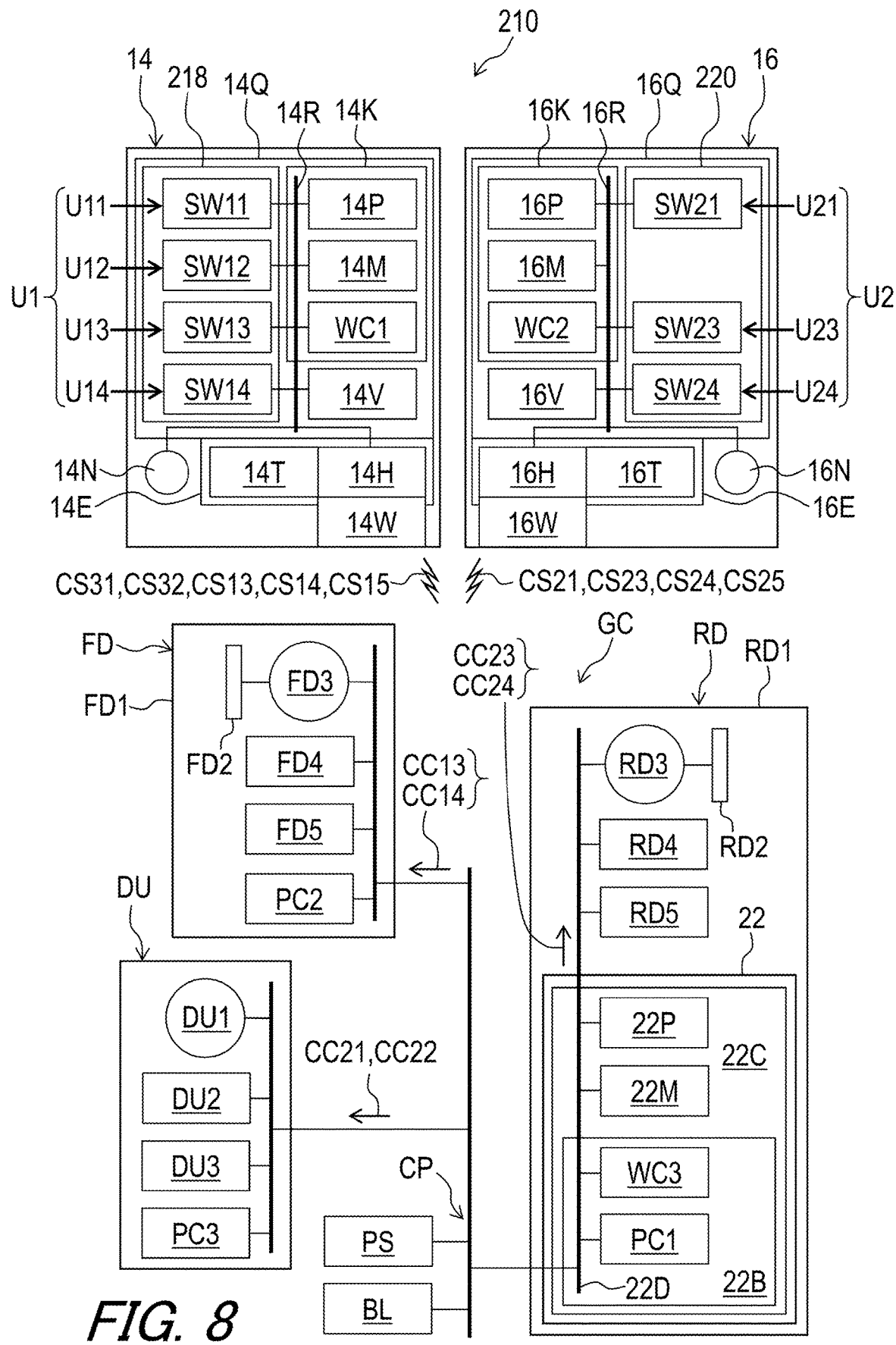
FIG. 8 is a schematic block diagram of a human-powered vehicle in accordance with a modification of the second embodiment.

As seen in FIG. 8, the second additional electrical switch SW22 can be omitted from the second user interface 220, and the first user interface 218 can include the first additional electrical switch SW12. A total number of the at least one first switch of the first user interface 218 is different from a total number of the at least one second switch of the second user interface 220. The total number of the at least one first switch of the first user interface 218 is four while the total number of the at least one second switch of the second user interface 220 is three.

In this modification of the second embodiment, the controller 222 can be configured to control the assist driving unit DU to change the assist driving force based on a first combination of the second user operation input U21 and the first user operation input U13. The controller 222 can be configured to control the assist driving unit DU to change the assist driving force based on a second combination of the second user operation input U21 and the first additional user operation input U14.

The controller 222 is configured to control the assist driving unit DU to decrease the assist driving force based on the first combination of the second user operation input U21 and the first user operation input U13. The controller 222 is configured to control the assist driving unit DU to increase the assist driving force based on the second combination of the second user operation input U21 and the first additional user operation input U14. The controller 222 is configured to control the assist driving unit DU to decrease the assist driving force based on the first combination of the second control signal CS21 and the first control signal CS13. The controller 222 is configured to control the assist driving unit DU to increase the assist driving force based on the second combination of the second control signal CS21 and the first additional control signal CS14.

The controller 222 is configured to control the assist driving unit DU to change the assist driving force based on the second user operation input U21 and the first user operation input U13 which are respectively received by the second electrical switch SW21 and the first electrical switch SW13 within a determination time. The controller 222 is configured to control the assist driving unit DU to change the assist driving force based on the second user operation input U21 and the first additional user operation input U14 which are respectively received by the second electrical switch SW21 and the first additional electrical switch SW14 within the determination time. The controller 222 is configured to control the assist driving unit DU to change the assist driving force based on the second control signal CS21 and the first control signal CS13 which are received by the controller 222 within a determination time. The controller 222 is configured to control the assist driving unit DU to change the assist driving force based on the second control signal CS21 and the first additional control signal CS14 which are received by the controller 222 within the determination time.

In this modification, the controller 222 can be configured to control another electric component other than the assist driving unit DU based on the first user operation input U11 and the first additional user operation input U12. For example, the controller 222 is configured to control, based on the first user operation input U11 and the first additional user operation input U12, another electric component such as the gear changing unit FD, the gear changing unit RD, an adjustable seatpost, an internal gear hub, a front suspension, a rear suspension, a cycle computer, a smartphone, a tablet computer, or a light emitting device.

Third Embodiment

An operating system 310 in accordance with a second embodiment will be described below referring to FIG. 9. The operating system 310 has the same structure and/or configuration as those of the operating system 10 except for the first user interface 218 and the controller 222. Thus, elements having substantially the same function as those in the above embodiments will be numbered the same here and will not be described and/or illustrated again in detail here for the sake of brevity.

Figure 9:
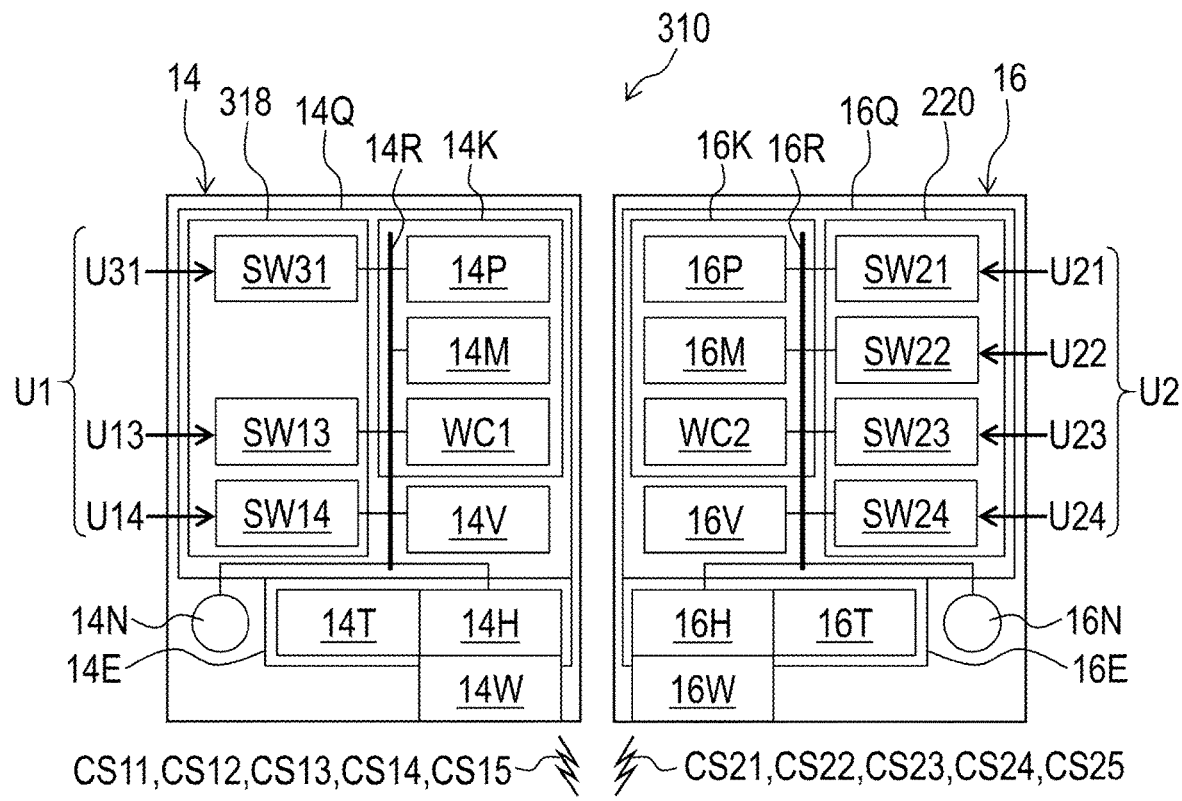
FIG. 9 is a schematic block diagram of a human-powered vehicle in accordance with a third embodiment.
Figure 9:
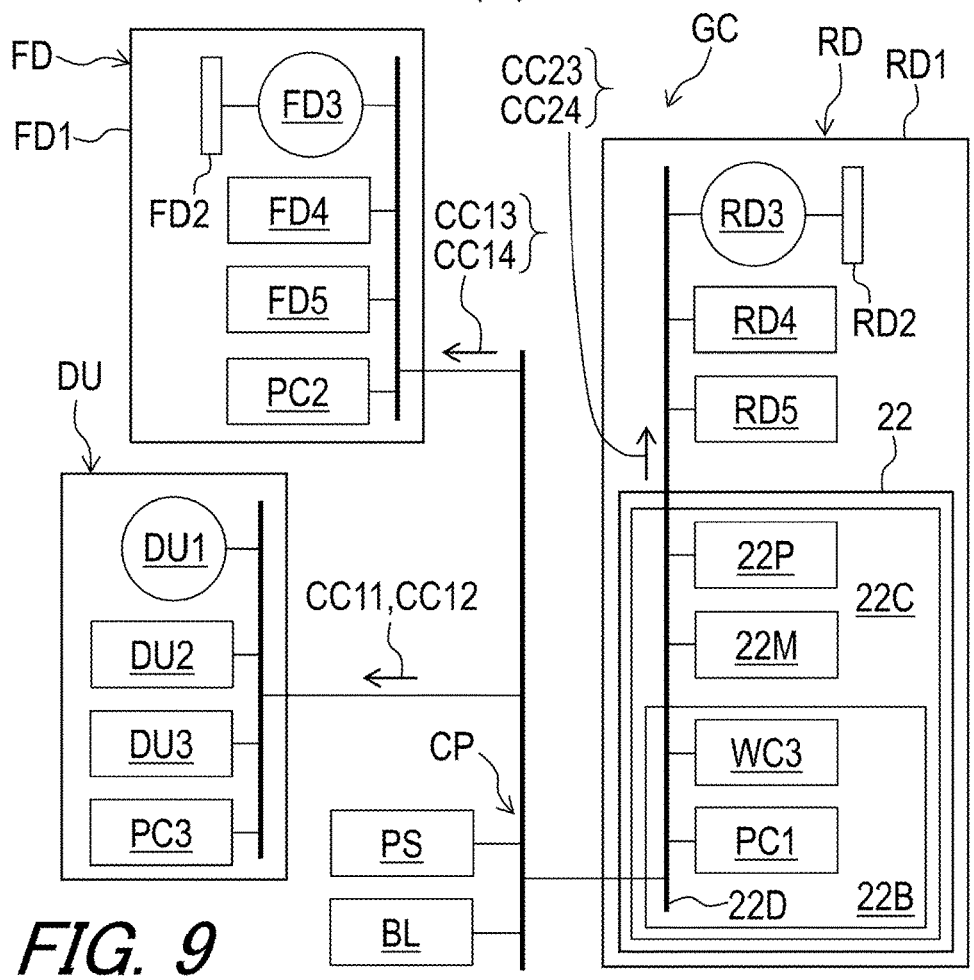

As seen in FIG. 9, the operating system 310 for the human-powered vehicle comprises the first operating device 14, the second operating device 16, a first user interface 318, and the second user interface 220. The operating system 310 further comprises a controller 322. The first user interface 318 has substantially the same structure as the structure of the first user interface 218 of the second embodiment. The controller 322 has substantially the same structure as the structure of the controller 222 of the second embodiment.

The first user interface 318 is configured to receive the first user input U1 and mounted to the first operating device 14. At least one of the first user interface 318 and the second user interface 220 is configured to be operated to control the assist driving unit DU configured to assist a human power. The first user interface 318 is configured to receive the first user input U1 and mounted to the first operating device 14. The second user interface 220 is configured to receive the second user input U2 and mounted to the second operating device 16. The first user interface 318 includes at least one first switch configured to receive the first user input U1. The second user interface 220 includes at least one second switch configured to receive the second user input U2.

In this embodiment, the first electrical switch SW11 and the first additional electrical switch SW12 are omitted from the first user interface 318. Instead, the first user input U1 includes a first user operation input U31. The first user interface 318 includes a first electrical switch SW31 configured to receive the first user operation input U31.

A total number of the at least one first switch of the first user interface 318 is different from a total number of the at least one second switch of the second user interface 220. The at least one first switch includes the first electrical switch SW31, the first electrical switch SW13, and the first additional electrical switch SW14. The at least one second switch includes the second electrical switch SW21, the second additional electrical switch SW22, the second electrical switch SW23, and the second additional electrical switch SW24. The total number of the at least one first switch of the first user interface 318 is three while the total number of the at least one second switch of the second user interface 220 is four.

At least one of the first user interface 318 and the second user interface 220 is configured to be operated to control the assist driving unit DU configured to assist a human power. The controller 322 is configured to control the assist driving unit DU to change the assist driving force generated by the assist driving unit DU based on at least one of the first user input U1 and the second user input U2. The controller 322 is configured to control the assist driving unit DU to change the assist driving force based on at least one of the first user operation input U31 and the second user operation input U21.

In this embodiment, the first user operation input U31 includes a first press of the first electrical switch SW31 in a first manner and a second press of the first electrical switch SW31 in a second manner different from the first manner. For example, the first electrical switch SW31 includes a multistage switch. The first manner includes a first depth of the first press of the first electrical switch SW31. The second manner includes a second depth of the second press of the first electrical switch SW31. The second depth is different from the first depth. The second depth of the second press is larger than the first depth of the first press. However, the first depth of the first press can be larger than the second depth of the second press.

The first communicator 14K is configured to be electrically connected to the first electrical switch SW31 to generate and transmit a first control signal CS31 in response to the first press of the first user operation input U31. The first communicator 14K is configured to be electrically connected to the first electrical switch SW31 to generate and transmit a first additional control signal CS32 in response to the second press of the first user operation input U31.

The controller 322 is configured to control the assist driving unit DU to increase the assist driving force based on one of the first press and the second press of the first electrical switch SW31. The controller 322 is configured to control the assist driving unit DU to decrease the assist driving force based on the other of the first press and the second press of the first electrical switch SW31. In this embodiment, the controller 322 is configured to control the assist driving unit DU to increase the assist driving force based on the first press of the first electrical switch SW31. The controller 322 is configured to control the assist driving unit DU to decrease the assist driving force based on the second press of the first electrical switch SW31. Specifically, the controller 322 is configured to control the assist driving unit DU to increase the assist driving force based on the first control signal CS31. The controller 322 is configured to control the assist driving unit DU to decrease the assist driving force based on the first additional control signal CS32. The controller 322 is configured to generate the first control command CC11 based on the first control signal CS31. The controller 322 is configured to generate the first additional control command CC12 based on the first additional control signal CS32.

Figure 10:
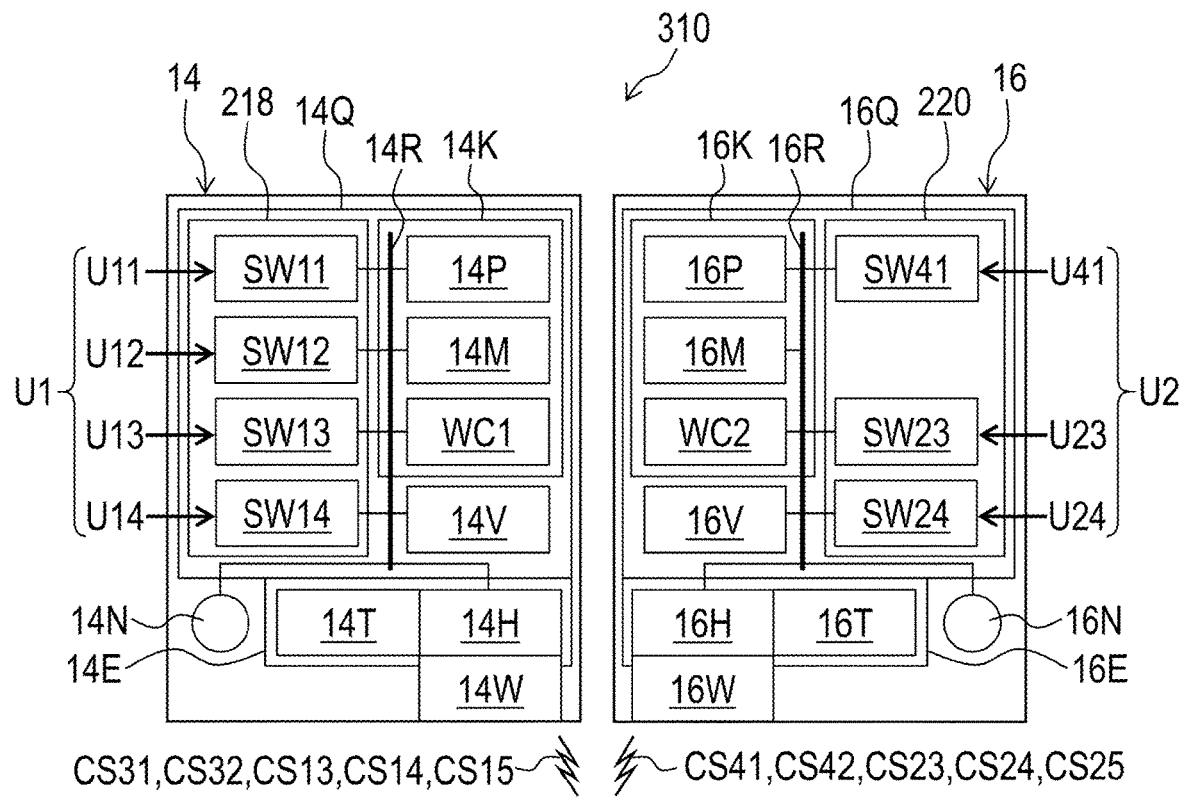
FIG. 10 is a schematic block diagram of a human-powered vehicle in accordance with a modification of the third embodiment.
Figure 10:
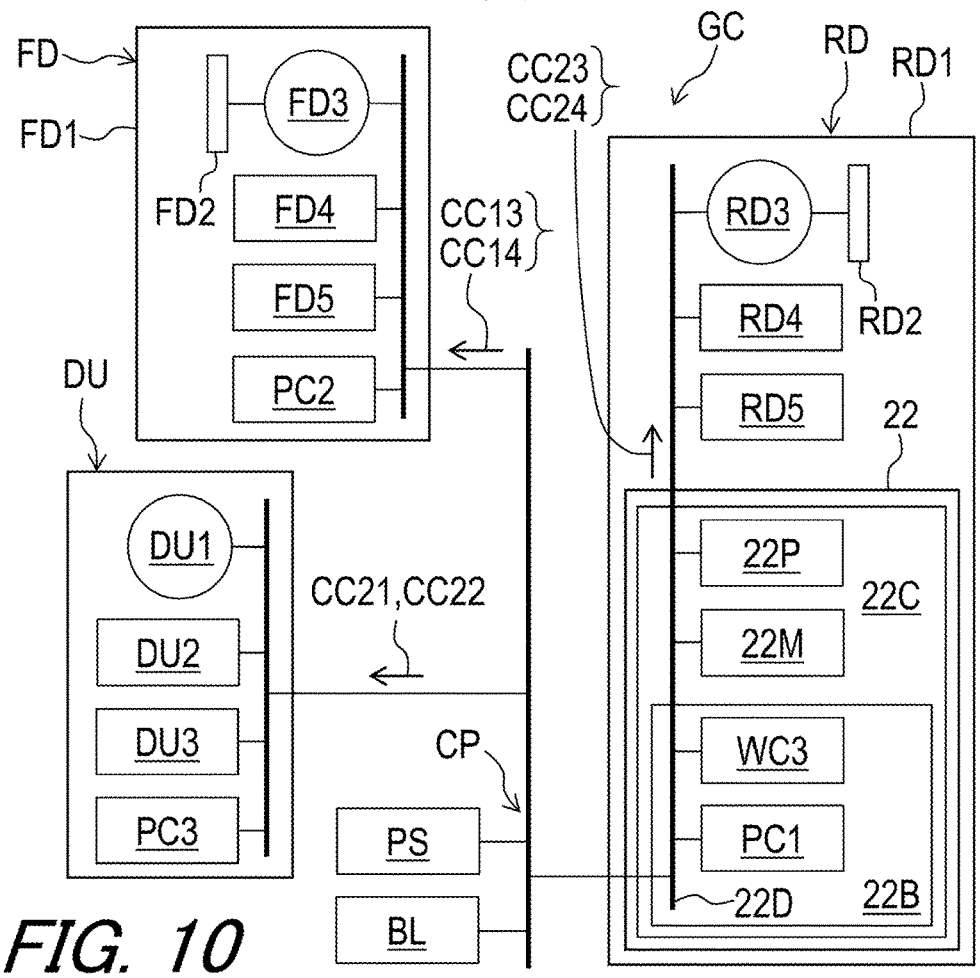

In this embodiment, the first electrical switch SW31 includes the multistage switch. As seen in FIG. 10, however, the second user interface 220 can include a second electrical switch SW41 having substantially the same structure as the structure of the first electrical switch SW31. The above description of the operating system 310 can be utilized as the description of the second electrical switch SW41 by respectively replacing the first electrical switch SW31, the first user operation input U31, the first control signal CS31, the first additional control signal CS32, the first control command CC11, and the first additional control command CC12 with the second electrical switch SW41, the second user operation input U41, the second user operation input U41, a second control signal CS41, a second additional control signal CS42, the second control command CC21, and the second additional control command CC22. Thus, they will not be described in detail here for the sake of brevity.

Modifications

In the third embodiment, the first manner includes the first depth of the first press of the first electrical switch SW31. The second manner includes the second depth of the second press of the first electrical switch SW31. However, the first manner and the second manner are not limited to this embodiment. For example, the first manner can include a first length of time of the first press of the first electrical switch SW31, and the second manner can include a second length of time of the second press of the first electrical switch SW31. The first length of time of the first press is different from the second length of time of the second press. The same can apply to the second electrical switch SW41 illustrated in FIG. 10.

In the above embodiments and the modifications, as seen in FIGS. 5 and 6, the first base member 14A includes the first grip portion 14G, and the second base member 16A includes the second grip portion 16G. However, the first grip portion 14G can be omitted from the first base member 14A. The second grip portion 16G can be omitted from the second base member 16A.

In the above embodiments and the above modifications, as seen in FIG. 4, the first operating device 14 is provided on the left side with respect to the center plane VH6 of the human-powered vehicle VH. The second operating device 16 is provided on the right side with respect to the center plane VH6 of the human-powered vehicle VH. However, the first operating device 14 can be provided on the right side with respect to the center plane VH6 of the human-powered vehicle VH. The second operating device 16 can be provided on the left side with respect to the center plane VH6 of the human-powered vehicle VH. The first operating device 14 and the second operating device 16 can be provided on the same side with respect to the center plane VH6 of the human-powered vehicle VH.

In the first embodiment, the first user interface 18 and the second user interface 20 are configured to be operated to control the assist driving unit DU. As with the second and third embodiments and the above modifications thereof, however, only one of the first user interface 18 and the second user interface 20 can be configured to be operated to control the assist driving unit DU.

In the above embodiments and the above modifications, as seen in FIGS. 5 and 6, the first operating member 14B includes the first lower end 14L and the first upper end 14U. The second operating member 16B includes the second lower end 16L and the second upper end 16U. However, the structure of the first operating member 14B is not limited to the above embodiments and the above modifications. The structure of the second operating member 16B is not limited to the above embodiments and the above modifications.

In the first embodiment, the total number of the at least one first switch of the first user interface 18 is equal to the total number of the at least one second switch of the second user interface 20. As with the second and third embodiments and the above modifications thereof, however, the total number of the at least one first switch of the first user interface 18 can be different from the total number of the at least one second switch of the second user interface 20. In the second and third embodiments and the above modifications thereof, the total number of the at least one first switch of the first user interface 218 or 318 is different from the total number of the at least one second switch of the second user interface 220 or 320. As with the first embodiment, however, the total number of the at least one first switch of the first user interface 218 or 318 can be equal to the total number of the at least one second switch of the second user interface 220 or 320. The total number of the at least one first switch of the first user interface 18, 218 or 318 is not limited to the above embodiments and the modifications. The total number of the at least one second switch of the second user interface 20, 220 or 320 is not limited to the above embodiments and the above modifications.

In the above embodiments and the above modifications, the controller 22, 222, or 322 is configured to control the gear changing device GC to change the gear ratio of the gear changing device GC based on one of the first user operation input U13, the first additional user operation input U14, the second user operation input U23, and the second additional user operation input U24. Specifically, the controller 22, 222, or 322 is configured to control the gear changing unit FD to change the gear ratio of the gear changing unit FD based on one of the first user operation input U13 and the first additional user operation input U14. The controller 22, 222, or 322 is configured to control the gear changing unit RD to change the gear ratio of the gear changing unit RD based on one of the second user operation input U23 and the second additional user operation input U24. However, at least one of the first user operation input U13, and the first additional user operation input U14, the second user operation input U23, and the second additional user operation input U24 can be used to operate another electric component such as the gear changing unit FD, the gear changing unit RD, an adjustable seatpost, an internal gear hub, a front suspension, a rear suspension, a cycle computer, a smartphone, a tablet computer, or a light emitting device.

In the first embodiment and the above modifications thereof, the controller 22 is configured to control the assist driving unit DU to increase the assist driving force based on the first user operation input U11. The controller 22 is configured to control the assist driving unit DU to decrease the assist driving force based on the second user operation input U21. However, the controller 22 can be configured to control the assist driving unit DU to increase the assist driving force based on the second user operation input U21. The controller 22 can be configured to control the assist driving unit DU to decrease the assist driving force based on the first user operation input U11. Similarly, the controller 22 can be configured to control the assist driving unit DU to increase the assist driving force based on the first additional user operation input U12. The controller 22 can be configured to control the assist driving unit DU to decrease the assist driving force based on the second additional user operation input U22.

In the first embodiment and the above modifications thereof, the first assist switch SW11, the second assist switch SW12, the first shift switch SW14, and the second shift switch SW13 are mounted to the first operating device 14. The first assist switch SW22, the second assist switch SW21, the first shift switch SW23, and the second shift switch SW24 are mounted to the second operating device 16. However, at least one of the first assist switch SW11, the second assist switch SW12, the first shift switch SW14, and the second shift switch SW13 can be mounted to the second operating device 16. At least one of the first assist switch SW22, the second assist switch SW21, the first shift switch SW23, and the second shift switch SW24 can be mounted to the first operating device 14.

Figure 11:
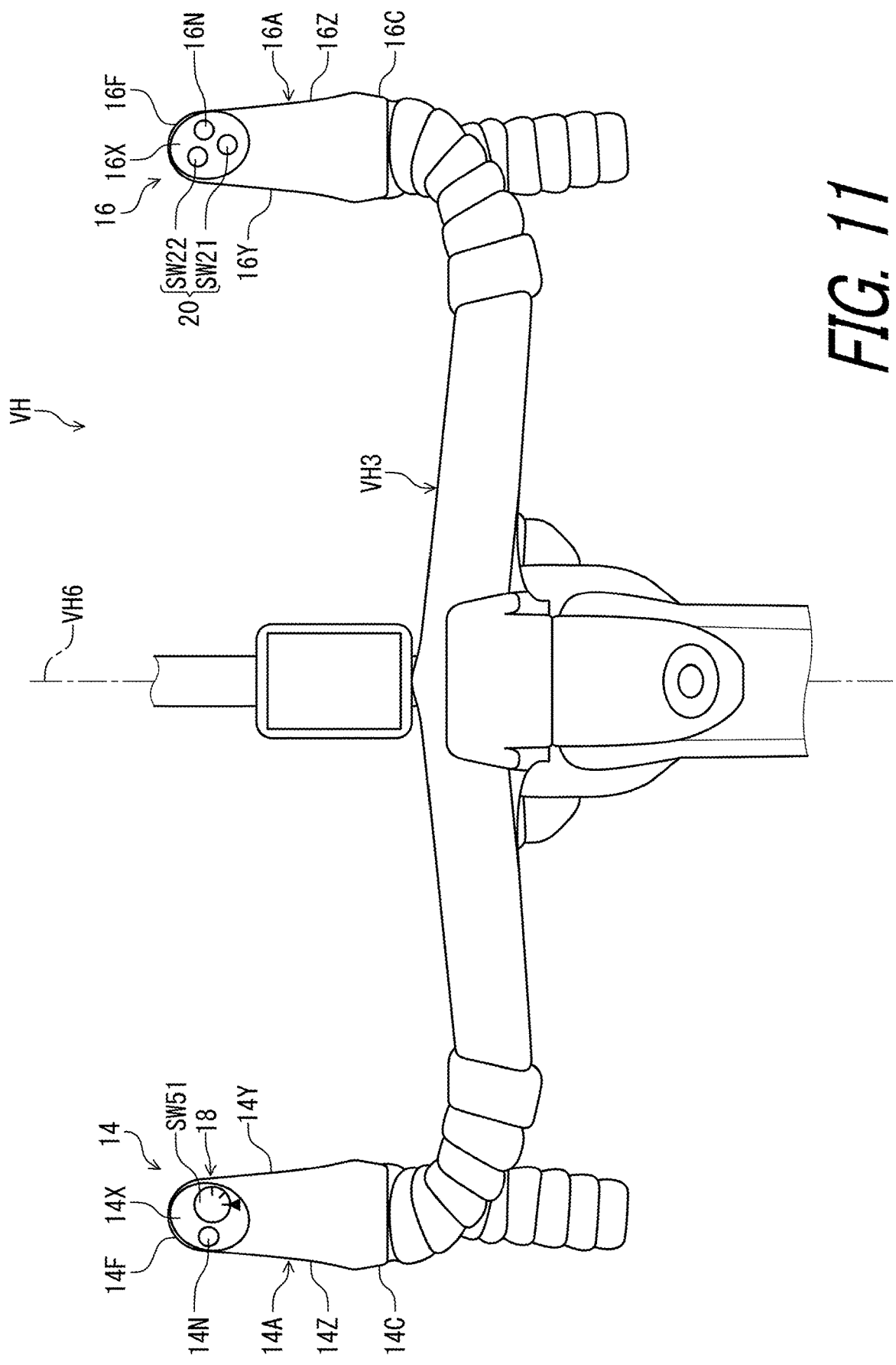
FIG. 11 is a plan view of the handlebar and an operating system in accordance with a modification.
Figure 12:
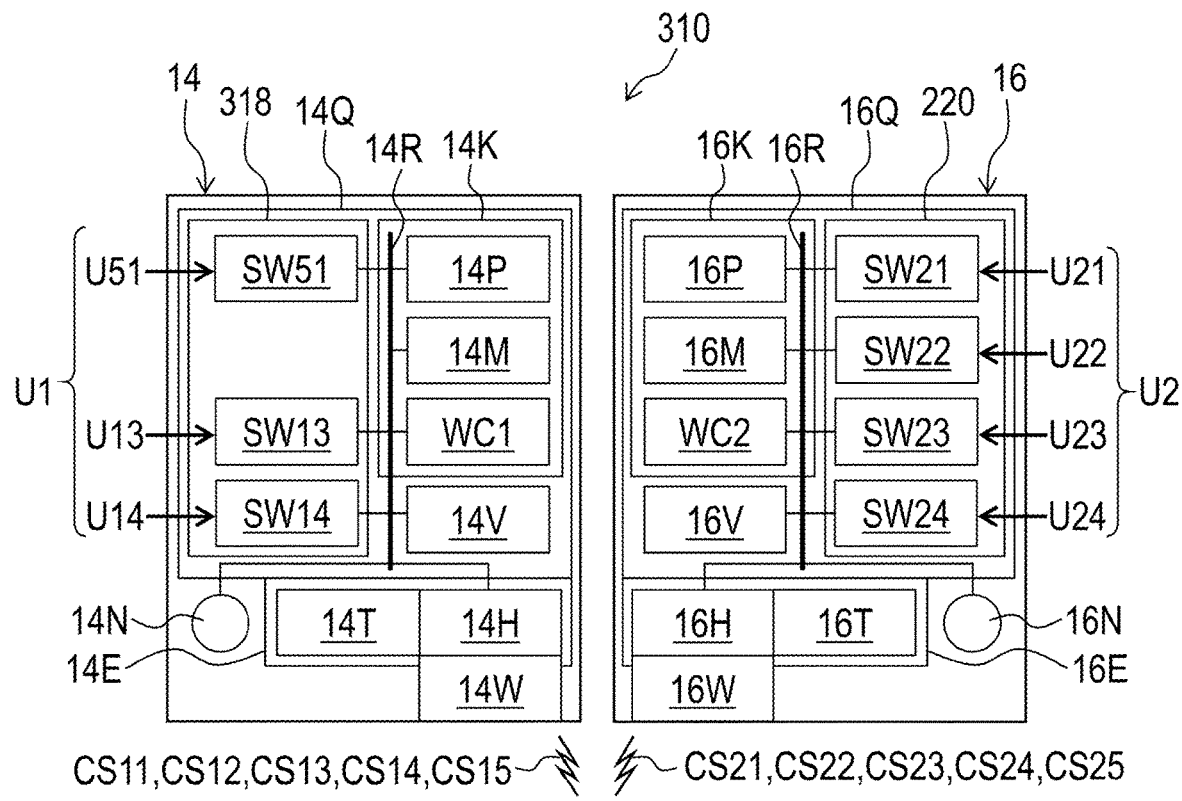
FIG. 12 is a schematic block diagram of a human-powered vehicle in accordance with the modification.
Figure 12:
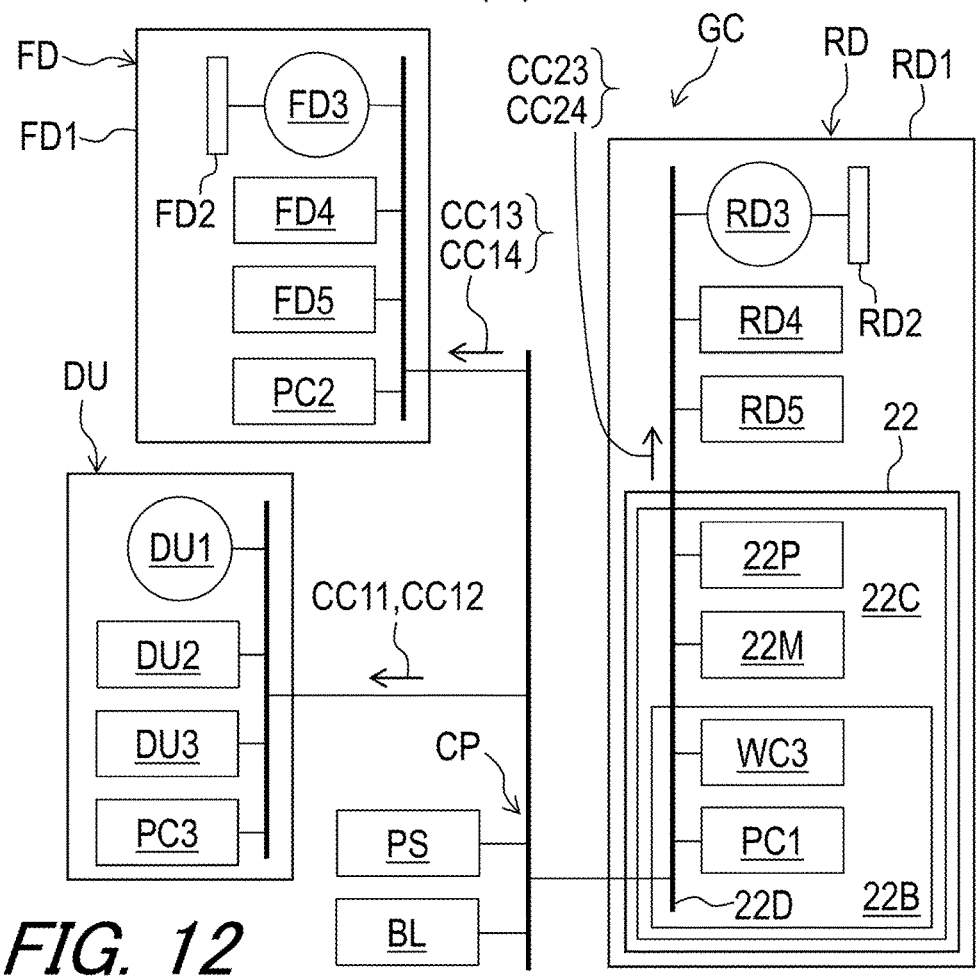

In the above embodiments and the above modifications, the assist switches SWi1, SW12, SW21, SW22, SW31, and SW41 include a push-button switch or a lever switch. However, at least one of the assist switches SW11, SW12, SW21, SW22, SW31, and SW41 can include other type of switch such as a dial switch. As seen in FIG. 11, the first user interface 18 can include a first electrical switch SW51 configured to receive a first user operation input U51 indicating the change in the assist driving force of the assist driving unit DU. The first electrical switch SW51 includes a first dial switch rotatably mounted to the first base member 14A. The first dial switch of the first electrical switch SW51 has a plurality of positions respectively indicating a plurality of assist ratios. For example, the first dial switch of the first electrical switch SW51 has a first position, a second position, and a third position respectively corresponding to a first assist ratio, a second assist ratio, and a third assist ratio. As seen in FIG. 12, the first communicator 14K is configured to transmit the first control signal CS11 when the first electrical switch SW51 is operated from the first position to the second position. The first communicator 14K is configured to transmit the first control signal CS11 when the first electrical switch SW51 is operated from the second position to the third position. The first communicator 14K is configured to transmit the first additional control signal CS12 when the first electrical switch SW51 is operated from the third position to the second position. The first communicator 14K is configured to transmit the first additional control signal CS12 when the first electrical switch SW51 is operated from the second position to the first position.

Figure 13:
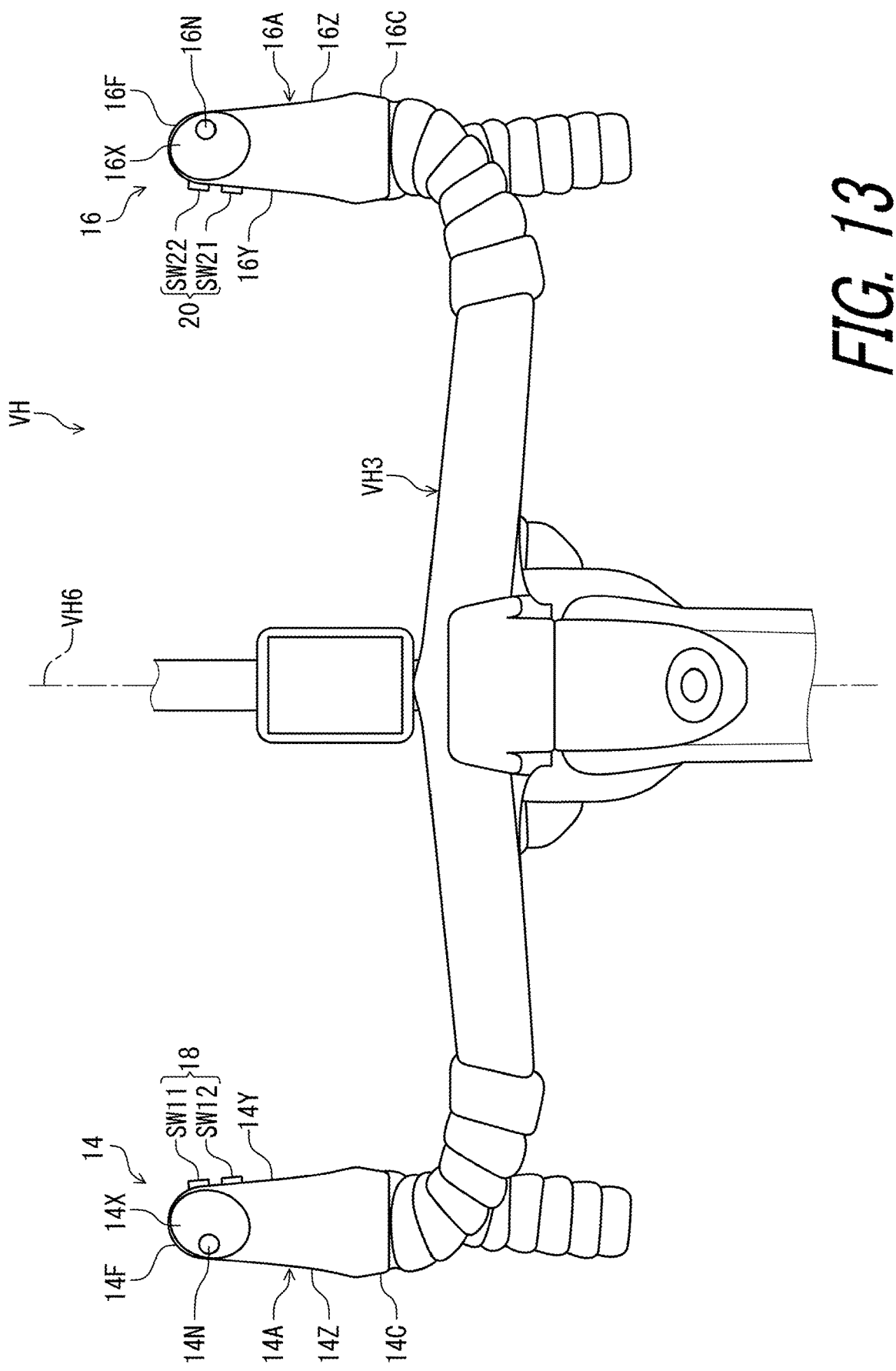
FIG. 13 is a plan view of the handlebar and an operating system in accordance with another modification.

In the above embodiments and the above modifications, the first assist switch SWI1 and the second assist switch SW12 are mounted to the pommel portion 14X of the first base member 14A. The first assist switch SW22 and the second assist switch SW21 are mounted to the pommel portion 16X of the second base member 16A. As seen in FIG. 13, however, at least one of the first assist switch SW11 and the second assist switch SW12 can be mounted to the inner lateral surface 14Y or other portions of the first base member 14A. At least one of the first assist switch SW22 and the second assist switch SW21 can be mounted to the inner lateral surface 16Y or other portions of the second base member 16A. In the modification illustrated in FIG. 13, the first assist switch SW11 and the second assist switch SW12 are mounted to the inner lateral surface 14Y of the first base member 14A. The first assist switch SW22 and the second assist switch SW21 are mounted to the inner lateral surface 16Y of the second base member 16A.

Figure 14:
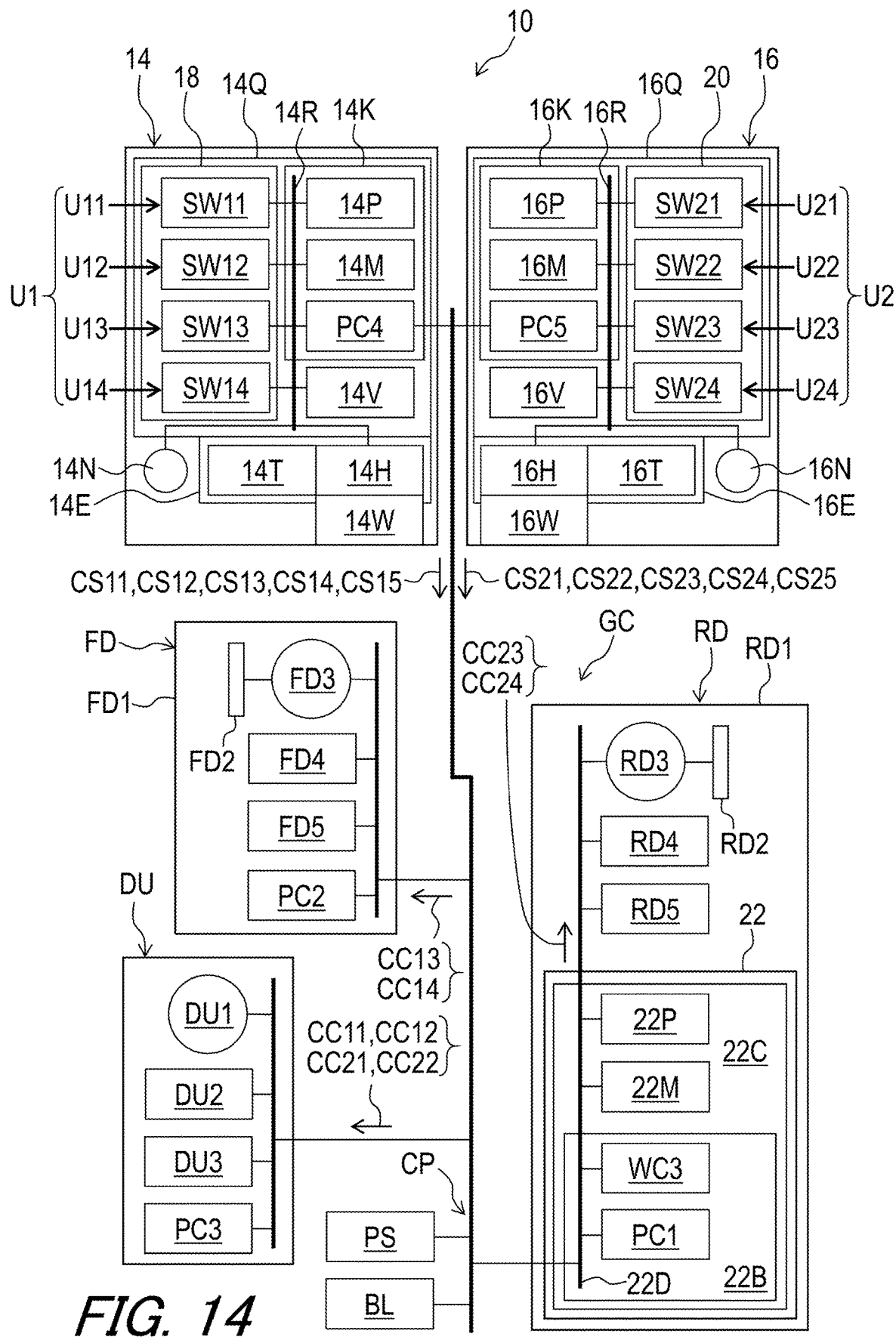
FIG. 14 is a schematic block diagram of a human-powered vehicle in accordance with another modification.

In the above embodiments and the above modifications, the first communicator 14K includes the first wireless communicator WC1, the second communicator 16K includes the second wireless communicator WC2, and the communicator 22B includes the wireless communicator WC3. However, at least one of the first operating device 14 and the second operating device 16 can be configured to communicate with the controller 22 using the PLC technology instead of the wireless technology. As seen in FIG. 14, for example, the first operating device 14 can include a first PLC controller PC4, and the second operating device 16 can include a second PLC controller PC5. The first PLC controller PC4 and the second PLC controller PC5 have substantially the same structure as the structure of the PLC controller PC1 of the controller 22. The first operating device 14 and the second operating device 16 are be configured to communicate with the controller 22 through the electric communication path CP.

In the above embodiments and the above modifications, the gear changing device GC includes the gear changing units FD and RD. However, the gear changing unit FD can be omitted from the gear changing device GC. In such modification, the first electrical switch SW13 and the first additional electrical switch SW14 can be omitted from the first user interface 18.

In the above embodiments and the above modifications, the first electrical switch SW13 and the first additional electrical switch SW14 are used for upshifting and downshifting of the gear changing unit FD. However, the first electrical switch SW13 and the first additional electrical switch SW14 can be omitted, and the second electrical switch SW23 and the second additional electrical switch SW24 can be used for upshifting and downshifting of the gear changing unit FD. In such modification, one of the second electrical switch SW23 and the second additional electrical switch SW24 is mounted to the first operating device 14. For example, the second electrical switch SW23 can be used for one of upshifting and downshifting of the gear changing unit RD, and the second additional electrical switch SW24 can be used for the other of upshifting and downshifting of the gear changing unit RD. The gear changing unit FD upshifts when the second electrical switch SW23 and the second additional electrical switch SW24 are concurrently operated in a state where the gear position of the gear changing unit FD is low gear. The gear changing unit FD downshifts when the second electrical switch SW23 and the second additional electrical switch SW24 are concurrently operated in a state where the gear position of the gear changing unit FD is top gear.

In accordance with a first aspect, an operating system for a human-powered vehicle comprises a first operating device, a second operating device, a first user interface, and a second user interface. The first operating device comprises a first base member and a first operating member. The first base member includes a first coupling end, a first free end, and a first grip portion. The first coupling end is configured to be coupled to a handlebar. The first free end is opposite to the first coupling end. The first grip portion is provided between the first coupling end and the first free end. The first operating member is pivotally coupled to the first base member about a first pivot axis. The second operating device comprises a second base member and a second operating member. The second base member includes a second coupling end, a second free end, and a second grip portion. The second coupling end is configured to be coupled to the handlebar. The second free end is opposite to the second coupling end. The second grip portion is provided between the second coupling end and the second free end. The second base member is a separate member from the first base member. The second operating member is pivotally coupled to the second base member about a second pivot axis. The first user interface is configured to receive a first user input and mounted to the first operating device. The second user interface is configured to receive a second user input and mounted to the second operating device. At least one of the first user interface and the second user interface is configured to be operated to control an assist driving unit configured to assist a human power.

With the operating system according to the first aspect, it is possible to operate the assist driving unit using at least one of the first user interface mounted to the first operating device and the second user interface mounted to the second operating device. Thus, the operating system can improve operability of the assist driving unit.

In accordance with a second aspect, an operating system for a human-powered vehicle comprises a first operating device, a second operating device, a first user interface, and a second user interface. The first operating device comprises a first base member and a first operating member. The first base member includes a first coupling end and a first free end. The first coupling end is configured to be coupled to a handlebar. The first free end is opposite to the first coupling end. The first operating member is pivotally coupled to the first base member about a first pivot axis. The first operating member includes a first lower end and a first upper end that is closer to the first base member than the first lower end. The first lower end is positioned below the first upper end while the first operating device is mounted to the handlebar. The second operating device comprises a second base member and a second operating member. The second base member includes a second coupling end and a second free end. The second coupling end is configured to be coupled to the handlebar. The second free end is opposite to the second coupling end. The second operating member is pivotally coupled to the second base member about a second pivot axis. The second operating member includes a second lower end and a second upper end that is closer to the second base member than the second lower end. The second lower end is positioned below the second upper end while the second operating device is mounted to the handlebar. The first user interface is configured to receive a first user input and mounted to the first operating device. The second user interface is configured to receive a second user input and mounted to the second operating device. At least one of the first user interface and the second user interface is configured to be operated to control an assist driving unit configured to assist a human power.

With the operating system according to the second aspect, it is possible to operate the assist driving unit using at least one of the first user interface mounted to the first operating device and the second user interface mounted to the second operating device. Thus, the operating system can improve operability of the assist driving unit.

In accordance with a third aspect, an operating system for a human-powered vehicle comprises a first operating device, a second operating device, a first user interface, and a second user interface. The first operating device comprises a first base member and a first operating member. The first base member includes a first coupling end, a first free end, and a first grip portion. The first coupling end is configured to be coupled to a handlebar. The first free end is opposite to the first coupling end. The first grip portion is provided between the first coupling end and the first free end. The first operating member is pivotally coupled to the first base member about a first pivot axis. The second operating device comprises a second base member and a second operating member. The second base member includes a second coupling end, a second free end, and a second grip portion. The second coupling end is configured to be coupled to the handlebar. The second free end is opposite to the second coupling end. The second grip portion is provided between the second coupling end and the second free end. The second base member is a separate member from the first base member. The second operating member is pivotally coupled to the second base member about a second pivot axis. The first user interface includes at least one first switch configured to receive a first user input. The at least one first switch is mounted to the first operating device. The second user interface includes at least one second switch configured to receive a second user input. The at least one second switch is mounted to the second operating device. A total number of the at least one first switch of the first user interface is different from a total number of the at least one second switch of the second user interface.

With the operating system according to the third aspect, it is possible to improve the flexibility in the arrangement of the at least one first switch and the at least one second switch. This can improve flexibility in designing the operating system.

In accordance with a fourth aspect, the operating system according to any one of the first to third aspects further comprises a controller configured to control the assist driving unit to change an assist driving force generated by the assist driving unit based on at least one of the first user input and the second user input.

With the operating system according to the fourth aspect, it is possible to reliably improve operability of the assist driving unit.

In accordance with a fifth aspect, the operating system according to the fourth aspect is configured so that the first user input includes a first user operation input. The second user input includes a second user operation input. The first user interface includes a first electrical switch configured to receive the first user operation input. The second user interface includes a second electrical switch configured to receive the second user operation input. The controller is configured to control the assist driving unit to change the assist driving force based on at least one of the first user operation input and the second user operation input.

With the operating system according to the fifth aspect, it is possible to operate the assist driving unit using at least one of the first electrical switch mounted to the first operating device and the second electrical switch mounted to the second operating device. Thus, the operating system can reliably improve operability of the assist driving unit.

In accordance with a sixth aspect, the operating system according to the third or fourth aspect further comprises a controller. The first user input includes a first user operation input. The second user input includes a second user operation input and a second additional user operation input. The at least one first switch includes a first electrical switch configured to receive the first user operation input. The at least one second switch includes a second electrical switch and a second additional electrical switch. The second electrical switch is configured to receive the second user operation input. The second additional electrical switch is configured to receive the second additional user operation input. The controller is configured to control the assist driving unit to change the assist driving force based on at least one of the first user operation input, the second user operation input, and the second additional user operation input.

With the operating system according to the sixth aspect, it is possible to reliably improve operability of the assist driving unit.

In accordance with a seventh aspect, the operating system according to any one of the fourth to sixth aspects is configured so that the controller is configured to control the assist driving unit to change the assist driving force based on the first user operation input. The controller is configured to control a gear changing device to change a gear ratio of the gear changing device based on the second user operation input.

With the operating system according to the seventh aspect, it is possible to operate the assist driving unit and the gear changing device using the first user interface and the second user interface. Thus, the operating system can reliably improve operability of the assist driving unit and the gear changing device.

In accordance with an eighth aspect, the operating system according to any one of the fourth to sixth aspects is configured so that the controller is configured to control the assist driving unit to increase the assist driving force based on one of the first user operation input and the second user operation input. The controller is configured to control the assist driving unit to decrease the assist driving force based on the other of the first user operation input and the second user operation input.

With the operating system according to the eighth aspect, it is possible to operate the assist driving unit using the first user interface and the second user interface. Thus, the operating system can reliably improve operability of the assist driving unit.

In accordance with a ninth aspect, the operating system according to the fifth aspect is configured so that the first user input includes a first additional user operation input. The second user input includes a second additional user operation input. The first user interface includes a first additional electrical switch configured to receive the first additional user operation input. The second user interface includes a second additional electrical switch configured to receive the second additional user operation input. The controller is configured to control the assist driving unit to change the assist driving force based on at least one of the first additional user operation input and the second additional user operation input.

With the operating system according to the ninth aspect, it is possible to reliably improve operability of the assist driving unit.

In accordance with a tenth aspect, the operating system according to the ninth aspect is configured so that the controller is configured to control the assist driving unit to increase the assist driving force based on one of the first user operation input and the first additional user operation input. The controller is configured to control the assist driving unit to decrease the assist driving force based on the other of the first user operation input and the first additional user operation input. The controller is configured to control a gear changing device to increase a gear ratio of the gear changing device based on one of the second user operation input and the second additional user operation input. The controller is configured to control the gear changing device to decrease the gear ratio of the gear changing device based on the other of the second user operation input and the second additional user operation input.

With the operating system according to the tenth aspect, it is possible to operate the assist driving unit and the gear changing device using the first user interface and the second user interface. Thus, the operating system can reliably improve operability of the assist driving unit and the gear changing device.

In accordance with an eleventh aspect, the operating system according to the ninth aspect is configured so that the controller is configured to control the assist driving unit to increase the assist driving force based on one of the first user operation input and the second user operation input. The controller is configured to control the assist driving unit to decrease the assist driving force based on the other of the first user operation input and the second user operation input. The controller is configured to control a gear changing device to increase a gear ratio of the gear changing device based on one of the first additional user operation input and the second additional user operation input. The controller is configured to control the gear changing device to decrease the gear ratio of the gear changing device based on the other of the first additional user operation input and the second additional user operation input.

With the operating system according to the eleventh aspect, it is possible to operate the assist driving unit and the gear changing device using the first user interface and the second user interface. Thus, the operating system can reliably improve operability of the assist driving unit and the gear changing device.

In accordance with a twelfth aspect, the operating system according to any one of the fourth to eleventh aspects is configured so that the controller is configured to control the assist driving unit to change the assist driving force based on a combination of the first user input and the second user input.

With the operating system according to the twelfth aspect, it is possible to operate the assist driving unit using the combination of the first user input and the second user input. Thus, the operating system can improve operability of the assist driving unit with simplifying the structure of the operating system.

In accordance with a thirteenth aspect, the operating system according to the twelfth aspect is configured so that the first user input includes a first user operation input. The second user input includes a second user operation input. The first user interface includes a first electrical switch configured to receive the first user operation input. The second user interface includes a second electrical switch configured to receive the second user operation input. The controller is configured to control the assist driving unit to change the assist driving force based on a first combination of the first user operation input and the second user operation input.

With the operating system according to the thirteenth aspect, it is possible to reliably improve operability of the assist driving unit with simplifying the structure of the operating system.

In accordance with a fourteenth aspect, the operating system according to the thirteenth aspect is configured so that the controller is configured to control the assist driving unit to change the assist driving force based on the first user operation input and the second user operation input which are respectively received by the first electrical switch and the second electrical switch within a determination time.

With the operating system according to the fourteenth aspect, it is possible to more reliably improve operability of the assist driving unit with simplifying the structure of the operating system.

In accordance with a fifteenth aspect, the operating system according to the thirteenth aspect is configured so that the second user input includes a second additional operation input. The second user interface includes a second additional electrical switch configured to receive the second additional user operation input. The controller is configured to control the assist driving unit to increase the assist driving force based on the first combination of the first user operation input and the second user operation input. The controller is configured to control the assist driving unit to decrease the assist driving force based on a second combination of the first user operation input and the second additional user operation input.

With the operating system according to the fifteenth aspect, it is possible to more reliably improve operability of the assist driving and the gear changing device unit with simplifying the structure of the operating system.

In accordance with a sixteenth aspect, the operating system according to the fifteenth aspect is configured so that the controller is configured to control a gear changing device to increase a gear ratio of the gear changing device based on one of the second user operation input and the second additional user operation input. The controller is configured to control the gear changing device to decrease the gear ratio of the gear changing device based on the other of the second user operation input and the second additional user operation input.

With the operating system according to the sixteenth aspect, it is possible to operate the assist driving unit and the gear changing device using the first user interface and the second user interface. Thus, the operating system can more reliably improve operability of the assist driving unit and the gear changing device with simplifying the structure of the operating system.

In accordance with a seventeenth aspect, the operating system according to any one of the fifth to sixteenth aspects is configured so that the first user operation input includes a first press of the first electrical switch in a first manner and a second press of the first electrical switch in a second manner different from the first manner. The controller is configured to control the assist driving unit to increase the assist driving force based on one of the first press and the second press of the first electrical switch. The controller is configured to control the assist driving unit to decrease the assist driving force based on the other of the first press and the second press of the first electrical switch.

With the operating system according to the seventeenth aspect, it is possible to change the assist driving force of the assist driving unit using the first electrical switch. Thus, the operating system can improve operability of the assist driving unit with simplifying the structure of the operating system.

In accordance with an eighteenth aspect, the operating system according to the seventeenth aspect is configured so that the first manner includes a first depth of the first press of the first electrical switch. The second manner includes a second depth of the second press of the first electrical switch, the second depth being different from the first depth.

With the operating system according to the eighteenth aspect, it is possible to reliably improve operability of the assist driving unit with simplifying the structure of the operating system.

In accordance with a nineteenth aspect, an operating system for a human-powered vehicle comprises a first operating device, a second operating device, a first assist switch, a second assist switch, a first shift switch, and a second shift switch. The first operating device comprises a first base member and a first operating member. The first base member includes a first coupling end, a first free end, and a first grip portion. The first coupling end is configured to be coupled to a handlebar. The first free end is opposite to the first coupling end. The first grip portion is provided between the first coupling end and the first free end. The first operating member is pivotally coupled to the first base member about a first pivot axis. The second operating device comprises a second base member and a second operating member. The second base member includes a second coupling end, a second free end, and a second grip portion. The second coupling end is configured to be coupled to the handlebar. The second free end is opposite to the second coupling end. The second grip portion is provided between the second coupling end and the second free end. The second operating member is pivotally coupled to the second base member about a second pivot axis. The first assist switch is configured to receive a first user assist input indicating an increase in an assist driving force of an assist driving unit. The first assist switch is mounted to one of the first operating device and the second operating device. The second assist switch is configured to receive a second user assist input indicating a decrease in the assist driving force of the assist driving unit. The second assist switch is mounted to one of the first operating device and the second operating device. The first shift switch is configured to receive a first user shift input indicating an increase in a gear ratio of a gear changing device. The first shift switch is mounted to one of the first operating device and the second operating device. The second shift switch is configured to receive a second user shift input indicating a decrease in the gear ratio of the gear changing device. The second shift switch is mounted to one of the first operating device and the second operating device.

With the operating system according to the nineteenth aspect, it is possible to operate the assist driving unit and the gear changing device using the first assist switch, the second assist switch, the first shift switch, and the second shift switch. Thus, the operating system can improve operability of the assist driving unit and the gear changing device with simplifying the structure of the operating system.

In accordance with a twentieth aspect, the operating system according to the nineteenth aspect further comprises a controller configured to control the assist driving unit to increase the assist driving force based on the first user assist input. The controller is configured to control the assist driving unit to decrease the assist driving force based on the second user assist input. The controller is configured to control the gear changing device to increase the gear ratio of the gear changing device based on the first user shift input.

The controller is configured to control the gear changing device to decrease the gear ratio of the gear changing device based on the second user shift input.

With the operating system according to the twentieth aspect, it is possible to reliably improve operability of the assist driving unit and the gear changing device with simplifying the structure of the operating system.

In accordance with a twenty-first aspect, the operating system according to the nineteenth or twentieth aspect is configured so that the first assist switch is mounted to the first operating device. The second assist switch is mounted to the first operating device. The first shift switch is mounted to the first operating device. The second shift switch is mounted to the first operating device.

With the operating system according to the twenty-first aspect, it is possible to reliably simplify the structure of the operating system.

In accordance with a twenty-second aspect, the operating system according to the nineteenth or twentieth aspect is configured so that the first assist switch is mounted to the first operating device. The second assist switch is mounted to the second operating device.

With the operating system according to the twenty-second aspect, it is possible to reliably improve operability of the assist driving unit and the gear changing device with simplifying the structure of the operating system.

In accordance with a twenty-third aspect, the operating system according to the nineteenth or twentieth aspect is configured so that the first assist switch is mounted to the first operating device. The second assist switch is mounted to the first operating device. The first shift switch is mounted to the second operating device. The second shift switch is mounted to the second operating device.

With the operating system according to the twenty-third aspect, it is possible to reliably improve operability of the assist driving unit and the gear changing device with simplifying the structure of the operating system.

In accordance with a twenty-fourth aspect, the operating system according to any one of the nineteenth to twenty-third aspects is configured so that the first assist switch is mounted to at least one of a pommel portion and an inner lateral surface of the first base member.

With the operating system according to the twenty-fourth aspect, it is possible to utilize the pommel portion and/or the inner lateral surface of the first base member to arrange the first assist switch.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating system for a human-powered vehicle, comprising:
   a first operating device comprising:
      a first base member including
         a first coupling end configured to be coupled to a handlebar,
         a first free end opposite to the first coupling end, and
         a first grip portion provided between the first coupling end and the first free end; and
      a first operating member pivotally coupled to the first base member about a first pivot axis; and
   a first user interface configured to receive a first user input, at least a portion of the first user interface being mounted to the first free end of the first operating device, the first user interface being configured to be operated to control at least one electronic component;
   a controller configured to control the at least one electric component based on the first user input; and
   a communicator provided to the first base member, the communicator including a wireless communicator being configured to be electrically connected to the first user interface and a processor, the wireless communicator and the processor being disposed closer to the first coupling end than to the first free end,
   the at least one electric component including at least one of a gear changing unit, an adjustable seatpost, an internal gear hub, a front suspension, a rear suspension, a cycle computer, a smartphone, a tablet computer, and a light emitting device, and
   the at least a portion of the first user interface faces away from a direction in which the first operating member extends from the first pivot axis, the at least a portion of the first user interface including each of a plurality of first base switches and a notification device, the notification device being disposed closer to the first free end than to the first coupling end, and the notification device is configured to notify a user of information relating to the first operating device.

2. The operating system according to claim 1, further comprising:
a second operating device comprising:
a second base member including
a second coupling end configured to be coupled to the handlebar,
a second free end opposite to the second coupling end, and
a second grip portion provided between the second coupling end and the second free end, the second base member being a separate member from the first base member; and
a second operating member pivotally coupled to the second base member about a second pivot axis; and
a second user interface configured to receive a second user input and mounted to the second operating device, wherein
the controller is configured to control at least one of the electric components based on a combination of the first user input and the second user input.

3. The operating system according to claim 2, wherein the second user interface is mounted to the second free end of the second operating device.

4. The operating system according to claim 2, wherein the second user interface includes a plurality of second base switches being mounted to the second base member and at least one second operation switch being mounted to the second operating member.

5. The operating system according to claim 1, wherein the first user interface includes at least one first operation switch being mounted to the first operating member.

6. The operating system according to claim 1, wherein the at least a portion of the first user interface faces in a direction orthogonal to the first pivot axis.

7. The operating system according to claim 1, wherein the plurality of first base switches face away from the direction in which the first operating member extends from the first pivot axis.

8. The operating system according to claim 7, wherein the plurality of first base switches face in a direction orthogonal to the first pivot axis.

9. The operating system according to claim 1, wherein the first user interface further includes a plurality of first operation switches being mounted to the first operating member.

10. The operating system according to claim 1, wherein the at least one electric component is at least one of the adjustable seatpost, the internal gear hub, the front suspension, the rear suspension, the smartphone, the tablet computer, and the light emitting device.

11. The operating system according to claim 1, wherein the first operating device includes an electric power source and a charging port configured to electrically connect a charging cable to the electric power source.

12. The operating system according to claim 1, wherein the notification device is configured to notify a user of a remaining level of a battery or a communication state of the communicator.

13. The operating system according to claim 1, wherein the notification device is configured to notify a user of a communication state of a communicator,
the notification device includes a light emitting element, and the communicator is configured to turn the notification device on based on the information.

14. An operating system for a human-powered vehicle, comprising:
a first operating device comprising:
a first base member including
a first coupling end configured to be coupled to a handlebar,
a first free end opposite to the first coupling end, and
a first grip portion provided between the first coupling end and the first free end; and
a first operating member pivotally coupled to the first base member about a first pivot axis; and
a first user interface configured to receive a first user input, at least a portion of the first user interface being mounted to the first free end of the first operating device, the first user interface being configured to be operated to control at least one electronic component;
a controller configured to control the at least one electric component based on the first user input; and
a communicator provided to the first base member, the communicator including a wireless communicator being configured to be electrically connected to the first user interface and a processor, the wireless communicator and the processor being disposed closer to the first coupling end than to the first free end,
the at least one electric component including at least one of a gear changing unit, an adjustable seatpost, an internal gear hub, a front suspension, a rear suspension, a cycle computer, a smartphone, a tablet computer, and a light emitting device, and
the at least a portion of the first user interface faces away from a direction in which the first operating member extends from the first pivot axis, wherein
the first user interface including a first dial switch rotatably mounted to the first base member to receive the first user input.

15. The operating system according to claim 14, wherein the first dial switch has a first position, a second position, and a third position respectively corresponding to a first assist ratio, a second assist ratio, and a third assist ratio.

16. The operating system according to claim 15, wherein the wireless communicator is configured to transmit a first control signal when the first dial switch is operated from the first position to the second position, and
the wireless communicator is configured to transmit a first additional control signal when the first dial switch is operated from the second position to the first position.

17. The operating system according to claim 15, wherein the wireless communicator is configured to transmit a first control signal when the first dial switch is operated from the first position to the second position,
the wireless communicator is configured to transmit the first control signal when the first dial switch is operated from the second position to the third position,
the wireless communicator is configured to transmit a first additional control signal when the first dial switch is operated from the third position to the second position, and
the wireless communicator is configured to transmit the first additional control signal when the first dial switch is operated from the second position to the first position.

18. The operating system according to claim 14, wherein the wireless communicator is configured to transmit a first control signal when the first dial switch is operated from a first position to a second position, and the wireless communicator is configured to transmit a first additional control signal when the first dial switch is operated from the second position to the first position.

19. The operating system according to claim 1, wherein the at least a portion of the first user interface being provided on a surface of the first free end, the surface facing away from the direction in which the first operating member extends from the first pivot axis, the at least a portion of the first user interface provided on the surface including each of the plurality of first base switches and the notification device.

* * * * *